(12) United States Patent
Caplan

(10) Patent No.: US 10,374,723 B2
(45) Date of Patent: Aug. 6, 2019

(54) APPARATUS AND METHODS FOR POWER EFFICIENT MULTI-FORMAT OPTICAL TRANSMISSION

(71) Applicant: Massachusetts Institute of Technology, Cambridge, MA (US)

(72) Inventor: David O. Caplan, Westford, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 15/881,388

(22) Filed: Jan. 26, 2018

(65) Prior Publication Data

US 2018/0343066 A1 Nov. 29, 2018

Related U.S. Application Data

(60) Provisional application No. 62/535,367, filed on Jul. 21, 2017, provisional application No. 62/450,765, filed on Jan. 26, 2017.

(51) Int. Cl.
| | |
|---|---|
| *H04B 10/00* | (2013.01) |
| *H04B 10/556* | (2013.01) |
| *H04B 10/11* | (2013.01) |
| *H04B 10/50* | (2013.01) |
| *H04B 10/67* | (2013.01) |
| *H04J 14/00* | (2006.01) |
| *H04J 14/02* | (2006.01) |

(52) U.S. Cl.
CPC ......... *H04B 10/5561* (2013.01); *H04B 10/11* (2013.01); *H04B 10/5055* (2013.01); *H04B 10/50577* (2013.01); *H04B 10/556* (2013.01); *H04B 10/677* (2013.01); *H04J 14/02* (2013.01)

(58) Field of Classification Search
CPC .............. H04B 10/516; H04B 10/556; H04B 10/5561; H04B 10/5563
See application file for complete search history.

(56) References Cited

U.S. PATENT DOCUMENTS

| | | |
|---|---|---|
| 8,073,342 B2 | 12/2011 | Caplan |
| 8,503,889 B2 | 8/2013 | Caplan et al. |
| 9,264,147 B2 | 2/2016 | Caplan et al. |

(Continued)

OTHER PUBLICATIONS

Caplan, D. O. et al., "Multi-format Optical Transceivers for Terrestrial and Satellite-based Free-space Optical Communications," OSA Advanced Photonics Congress, Photonics Networks Conference, Jul. 24, 2017, 44 pages.

(Continued)

*Primary Examiner* — Daniel G Dobson
(74) *Attorney, Agent, or Firm* — Smith Baluch LLP

(57) ABSTRACT

An apparatus for generating a processed optical signal includes a first laser configured to emit a first optical signal in response to a first drive signal. The first optical signal has a first phase shift depending on a first integrated amplitude of the first drive signal. The apparatus also includes a spectral-temporal filter, in optical communication with the first laser, to change a first spectral profile and a first temporal profile of the first optical pulse so as to generate the processed optical signal. Replacing a conventional continuous-wave (CW) laser and external modulation with filter-based modulation can achieve the same or better performance without high-fidelity low-noise input signals.

26 Claims, 34 Drawing Sheets

(56) References Cited

U.S. PATENT DOCUMENTS

| | | | |
|---|---|---|---|
| 2004/0061922 A1 | 4/2004 | Mauro et al. | |
| 2006/0008278 A1 | 1/2006 | Kao et al. | |
| 2008/0285977 A1* | 11/2008 | Caplan | H04B 10/504 398/130 |
| 2012/0281990 A1 | 11/2012 | Caplan | |
| 2016/0127045 A1 | 5/2016 | Asaka et al. | |

OTHER PUBLICATIONS

Caplan, D. O. et al., "Power and Photon-efficient WDM-Scalable DPSK Lasercom Transceivers," SPIE Photonics West, Jan. 30, 2017, 31 pages.

Caplan, D. O. et al., "Ultra-wide-range Multi-rate DPSK Laser Communications," Optical Society of America, Paper CPDA8, 2010, 2 pages.

Franklin, J. et al., "Generation of RZ-DPSK using a Chirp-Managed Laser (CML)," IEEE, 2008, 3 pages.

International Search Report and Written Opinion dated Apr. 12, 2018 for International Application No. PCT/US2018/015539, 18 pages.

Shirasaki, M. et al., "Fibre Transmission Properties of Optical Pulses Produced Through Direct Phase Modulation of DFB Laser Diode," Electronics Letters, vol. 24, No. 8, Apr. 14, 1988, pp. 486-487.

Vodhanel, R. S. et al., "FSK Heterodyne Transmission Experiments at 560 Mbit/s and 1 Gbit/s," Journal of Lightwave Technology, vol. LT-5, No. 4, Apr. 1987, pp. 461-468.

Vodhanel, R. S. et al., "Performance of Directly Modulated DFB Lasers in 10-Gb/s ASK, FSK, and DPSK Lightwave Systems," Journal of Lightwave Technology, vol. 8, No. 9, Sep. 1990, pp. 1379-1386.

Vodhanel, R. S., "5 Gbit/s Direct Optical DPSK Modulation of a 1530-nm DFB Laser," IEEE Photonics Technology Letters, vol. 1, No. 9, Aug. 1989, pp. 218-220.

\* cited by examiner

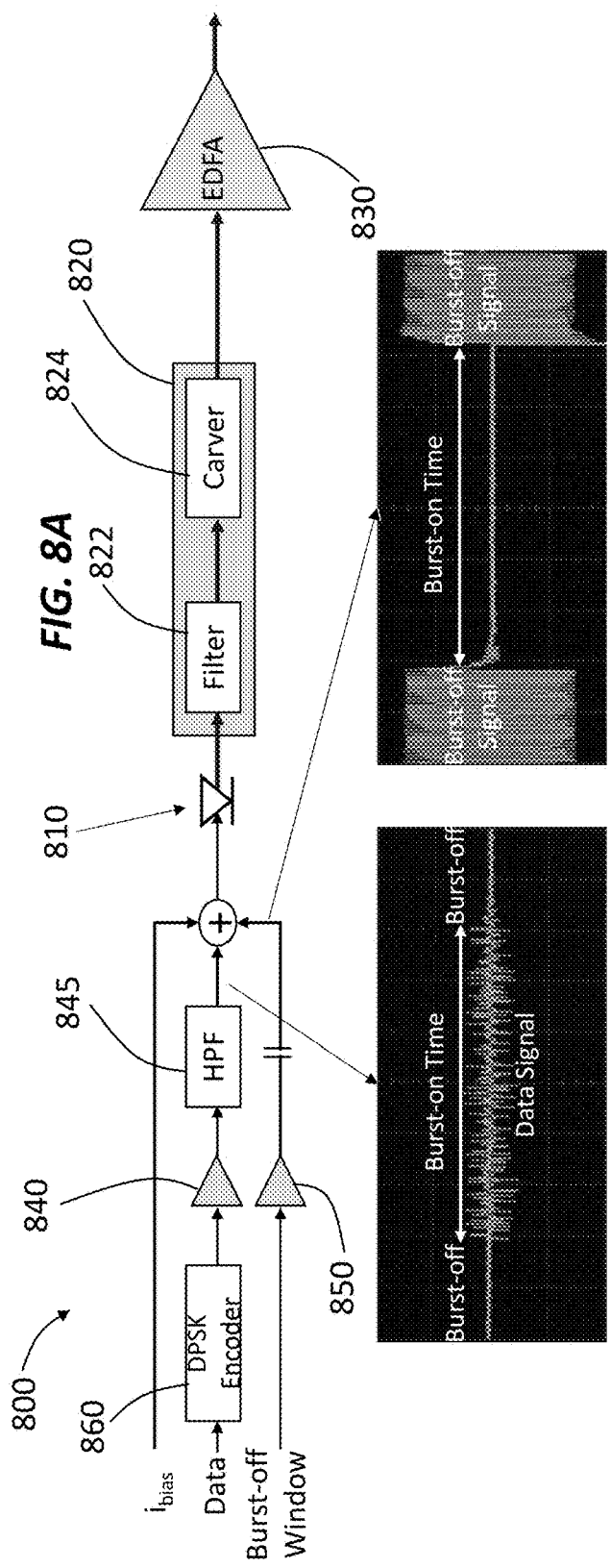

APPARATUS AND METHODS FOR POWER EFFICIENT MULTI-FORMAT OPTICAL TRANSMISSION

CROSS-REFERENCE TO RELATED APPLICATIONS

This application claims the priority benefit, under 35 U.S.C. 119(e) of U.S. Provisional Patent Application No. 62/450,765, filed on Jan. 26, 2017, and entitled "POWER EFFICIENT MULTI-FORMAT OPTICAL TRANSMITTERS" and U.S. Provisional Patent Application No. 62/535,367, filed on Jul. 21, 2017, and entitled "POWER EFFICIENT MULTI-FORMAT OPTICAL TRANSMITTERS," which applications are incorporated herein by reference in their entirety.

GOVERNMENT SUPPORT

This invention was made with Government support under Grant No. FA8721-05-C-0002 awarded by the U.S. Air Force. The Government has certain rights in the invention

BACKGROUND

Optical differential phase-shift-keying (DPSK) modulation is an attractive format for both high-rate fiber and free-space optical communication links. Compared to coherent phase shift keying (PSK), DPSK receivers are often easier to implement since they have relaxed linewidth requirements and can operate without optical phase locking to a local oscillator, which is a process that can extend temporal acquisition by tens of seconds and can be problematic for operation over a fading free-space channel. Compared to M-ary pulse-position modulation (M-PPM), DPSK has lower peak power, is more bandwidth efficient, and can be readily scaled to higher rates using non-adjacent differential encoding on a single channel, or using multiple wavelength division multiplexed (WDM) channels.

Currently, DPSK is usually implemented using a master oscillator power amplifier (MOPA) transmitter. A MOPA transmitter usually includes an external data modulator to generate the phase encoding. In addition, in systems using wavelength division multiplexing, each wavelength channel usually has its own external modulator. Therefore, as the number of wavelength channels increases, the size, weight, and power (SWaP) of the resulting transmitter can be too large to be implemented in SWaP-constrained applications, such as free-space communication.

Furthermore, for power-starved free-space applications, multi-rate capability can provide valuable architectural flexibility by extending the operational range of receiver (RX) power levels. This allows on-demand bandwidth when conditions are favorable, fallback modes, and operation with a variety of link conditions and transmitter (TX) and receiver (RX) designs. However, it can be challenging to scale MOPA transmitters to lower rates (e.g., about 500 Mbps or less) with good sensitivity due to limited availability of three primary elements and associated challenges: complex long-delay delay-line interferometers, matched narrow-band optical filters, and narrow-linewidth laser sources.

SUMMARY

Embodiments of the present technology generally relate to optical transmitters for optical communication. In one example, an apparatus for generating a processed optical signal includes a first laser configured to emit a first optical signal in response to a first drive signal. The first optical signal has a first phase shift depending on a first integrated amplitude of the first drive signal. The apparatus also includes a spectral-temporal filter, in optical communication with the first laser, to change a first spectral profile and a first temporal profile of the first optical pulse so as to generate the processed optical signal.

In another example, a method of generating a processed optical signal includes causing a first laser to emit a first optical signal having a first phase shift depending on a first integrated amplitude of a first drive signal. The method also includes passing the first optical signal through a spectral-temporal filter to change a first spectral profile and a first temporal profile of the first optical signal so as to generate the processed optical signal.

In yet another example, a transmitter for generating a differential phase shift keyed (DPSK) optical signal includes a DPSK encoder to convert a data signal into a pre-coded DPSK signal and a first driver, operably coupled to the DPSK encoder, to convert the pre-coded DPSK signal into a first drive signal. The transmitter also includes a laser, operably coupled to the first driver, to emit a first optical signal in response to the first drive signal. The first optical signal has a phase shift depending on an amplitude of the first drive signal. A spectral filter is in optical communication with the laser and characterized by a spectral pass band to spectrally filter the first optical signal. A temporal filter is in optical communication with the laser to temporally filter the first optical signal so as to yield the DPSK optical signal. The transmitter also includes a second driver, operably coupled to the laser, to generate a second drive signal, causing the laser to generate an optical beam having a wavelength outside the spectral pass band of the first filter. The second driver is configured to change a duty cycle of the DPSK optical signal between about 2.5% and about 100%.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 8A-8F illustrate multi-rate operation of an optical communication system using DMLs and time-frequency filtering.

DETAILED DESCRIPTION

Apparatus for Power Efficient Optical Transmission

To address the challenges in conventional optical transmitters for differential phase shift keying (DPSK), apparatus and methods described herein employ directly modulated laser (DML) to generate a phase-modulated optical signal. A spectral-temporal filter adjusts the spectral-temporal profile of the optical signal (also referred to as time-frequency filtering) so as to, for example, increase the fidelity of the waveform for optical communication. Multi-rate operation can be achieved using a drive signal (also referred to as a burst-off signal) to cause the DML to emit at wavelengths outside the spectral passband of the spectral-temporal filter.

Apparatus and methods described herein can provide an improved low-power means of generating high-fidelity, phase-modulated optical signals compatible with good receiver sensitivities. Replacing a conventional continuous-wave (CW) laser and external modulation with filter-based modulation can achieve the same or better performance without high-fidelity low-noise input signals. This enables standard low-power and potentially noisy logic gates to be used to directly drive the optical transmitter without a significant decrease in waveform fidelity or extinction ratio (ER).

Figure 1:
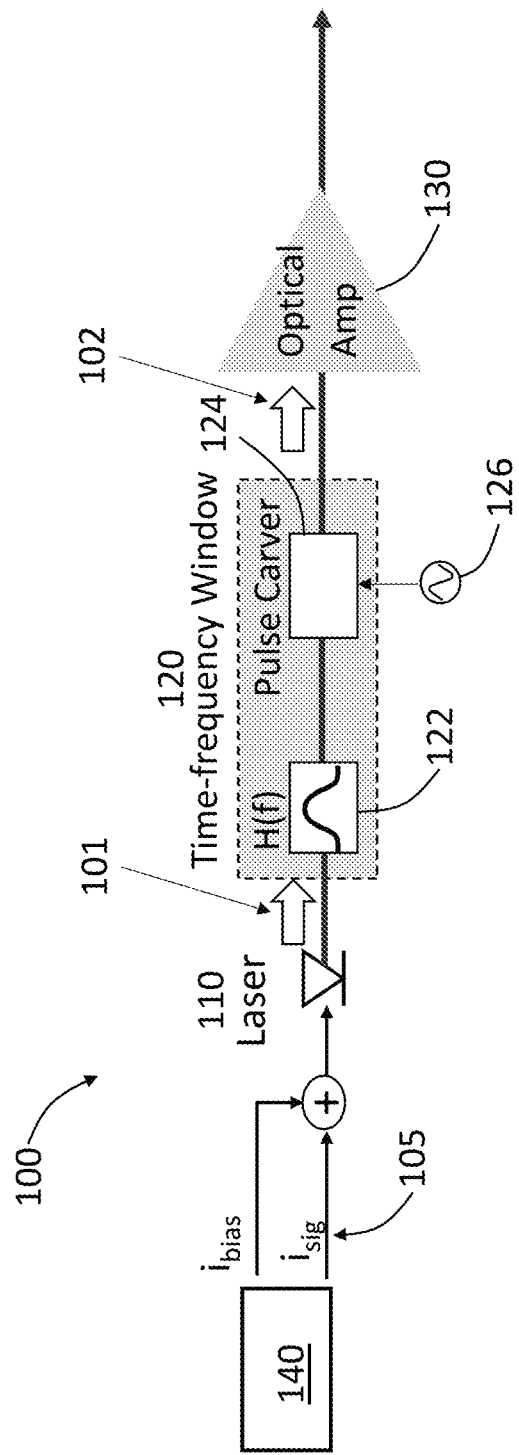
FIG. 1 shows a schematic of an apparatus for generating a processed optical signal that can be used for optical communication using differential phase shift keying (DPSK).

FIG. 1 shows a schematic of an apparatus 100 for generating a processed optical signal for optical communication using DPSK. The apparatus 100 includes a laser 110 to emit an optical signal 101. The laser 110 is driven by a drive signal ($i_{sig}$) 105 provided by a driver 140. The phase shift of the optical signal 101 depends on an integrated amplitude of the drive signal 105. Without being bound by any particular theory or mode of operation, the integrated amplitude of the drive signal 105 refers to the integral of the signal amplitude A over the duration of the signal amplitude T, i.e. $\int_0^T A dT$. In general, a larger integrated amplitude can introduce a greater phase shift in the optical signal 101 (see, e.g., FIGS. 2A-2B and FIG. 3). An optional bias signal ($i_{bias}$) can also be used to, for example, apply a bias voltage on the laser 110. In some examples, the bias signal is also provided by the driver 140. In other examples, the bias signal can be provided by a separate driver.

The apparatus 100 also includes a spectral-temporal filter 120 (also referred to as a spectral-temporal window 120 or time-frequency window 120), which changes the spectral-temporal profile of the optical signal 101 to generate a processed optical signal 102. An optical amplifier 130 (e.g., an Erbium-doped fiber amplifier or EDFA) is used in the apparatus 100 to amplify the processed optical signal 102.

In some examples, the spectral-temporal filter 120 includes a spectral filter 122 and a temporal filter 124 (also referred to as a carver 124) as illustrated in FIG. 1. The spectral filter 120 is characterized by a pass band (see, e.g., FIGS. 8A-8F) to pass light at wavelengths within the pass band and attenuate/block light at wavelengths outside the pass band, thereby modifying the spectral profile of the optical signal 101. The temporal filter 124 can have a temporally periodic transmission profile. It may pass light when the transmission is high (also referred to as carver-off time) and attenuate/block light when the transmission is low (also referred to as carver-on time), thereby modifying the temporal profile of the optical signal 101.

The temporal filter 124 can be driven by a filter driver 126, which can control the amplitude and timing of the transmission of the temporal filter 124. For example, the filter driver 126 can be synchronized with the laser driver 140. The synchronization allows the temporal filter 124 to pass optical beams emitted by the laser 110 and block other optical beams. Alternatively or additionally, the synchronization also allows the temporal filter 124 to pass certain portions of an optical beam (e.g., the peak or valley) emitted by the laser 110 and to attenuate/block other portions of the optical beam (e.g., transition regions between the peak and the valley).

The laser 110 can include any laser that can be directly phase modulated. For example, the laser 110 can include a current-driven laser, and the phase shift of the optical signal 101 is controlled by the drive current. Examples of current-driven lasers include semiconductor lasers, such as distributed feedback (DFB) lasers, distributed Bragg reflector (DBR) lasers, and vertical-cavity surface-emitting lasers (VCSELs), among others. Using drive current to directly modulate the laser output (i.e., optical signal 101) can allow power efficient operation of the resulting transmitter. For example, an electrical current of about 30 mA or less can produce a date rate of about 2 GHz or greater.

The drive signal 105 may be configured to introduce different amounts of phase shifts into the optical signal 101 for different phase encoding schemes. In one example, the drive signal 105 can introduce a phase shift of 0 (i.e., no phase shift) or π (i.e. half-cycle shift) into the optical signal 101 for 2-DPSK encoding. In another example, the drive signal 105 can be configured to introduce phase shifts of ±π for 2-DPSK encoding. In yet another example, the drive signal 105 can be configured to introduce phase shifts of ±π and ±π/2 for 4-DPSK encoding. As used herein, DPSK generically refers to differentially encoded phase shift keying, which can include binary or 2-DPSK as well has higher order DPSK (e.g. differential quadrature phase shift keying, or DQPSK, also referred to as 4-DPSK).

The amount of phase shift introduced by the drive signal 105 into the optical signal 101 can be controlled by either the amplitude A of the drive signal 105 or the duration T (also referred to as width T) of the drive signal 105. For example, an amplitude A and width $T_1$ can be used to generate a phase shift of π, and the same amplitude A and half the width $T_1/2$ can be used to generate a phase shift of π/2. When the duration T is used to control the phase shift, it can be helpful to temporally align the driver 140 with the filter driver 126 of the temporal filter 124, such that the temporal filter 124 passes the optical signal 101. In other words, the transition (e.g. power and phase transition) occurs during the carver-off time of the temporal filter 124 with the desired phase passed during the carver on-time. Since DPSK usually uses the end-state integrated phase for encoding, it can be advantageous to align as much of the transition time to the carver-off time as possible. Attenuation (blocking) can be generated by the spectral filtering (in the spectral filter 122) of POS and NEG out-of-band waveforms in conjunction with the timing of the transitions aligned with the carver off-time.

The spectral filter 122 can be optional, in which case the spectral-temporal filter 120 includes only the temporal filter 124. This configuration can be useful for full-rate communications, where the optical signal 101 is only attenuated/blocked during the carver-off time. Outside the carver-off time, the optical signal 101 has a 100% duty cycle.

The spectral filter 122 can include any suitable wavelength selective filter, such as an arrayed waveguide grating (AWG) or a fiber Bragg grating (FBG). In some examples, the bandwidth of the pass band of the spectral filter 122 can be substantially less than 3 r (e.g., 50% of 3 r, 30% of 3 r, 20% of 3 r, 10% of 3 r, 5% of 3 r, 3% of 3 r, or less, including any values and sub ranges in between), where r is the symbol rate of the optical signal 101 (also the symbol rate of the processed optical signal 102). This configuration can reduce the power consumption in achieving good DML-TF-based ER for a given data rate.

In some examples, the center frequency of the pass band of the spectral filter 122 can be offset from the carrier frequency of the optical signal 101. This offset can improve the ER by shifting the spectral filter 122 away from the high-power part of the optical signal 101 so that it provides better rejection where desired.

In one example, the spectral filter 122 can be placed before the temporal filter 124, in which case the optical signal 101 undergoes spectrally filtering followed by temporal filtering. In another example, the spectral filter 122 can be placed after the temporal filter 124. In this case, the optical signal 101 is temporally carved first followed by spectral filtering.

Figure 2:
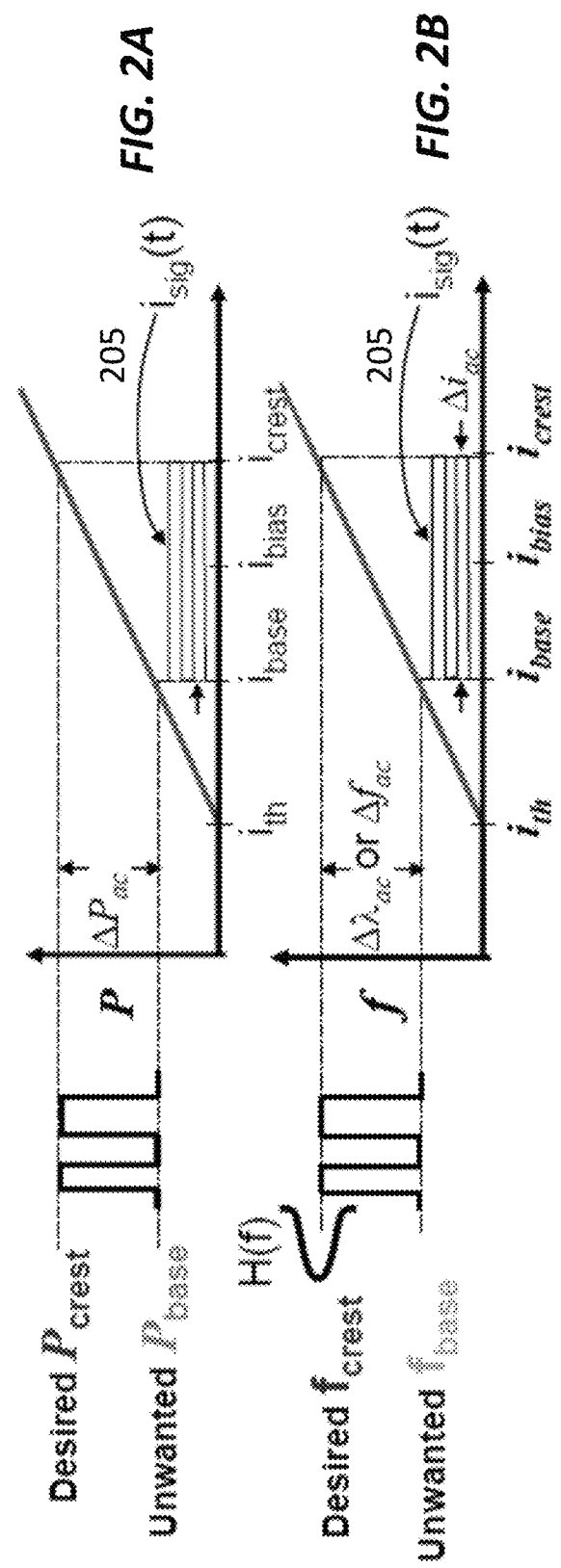
FIGS. 2A and 2B illustrate the effects of drive current on the output power, frequency, and phase of a directly modulated laser.

FIGS. 2A and 2B illustrate the effects of drive current 205 on the output power, frequency, and phase of a directly modulated laser. FIG. 2A shows that the output power of the DML (e.g., 110 in FIG. 1) generally increases as the drive current 205 increases. Therefore, the drive current 205 can be used for amplitude modulation (AM). FIG. 2B shows that the frequency of the output also increases as the drive current 205 increases, thereby allowing frequency modulation (FM). The AM modulation can yield an unfiltered extinction ratio $ER=P_{base}/P_{crest}$. For low power applications (e.g., $\Delta i_{ac}$ less than about 20 mA, and $i_{bias}$ less than about 100 mA as illustrated in FIG. 2B), the ER may range from about 1 dB to about 7 dB depending on the bias current $i_{bias}$, the magnitude of the drive waveform $\Delta i_{ac}$, and desired peak or average output power.

For fast DML waveforms with bandwidth much greater than about 1 MHz, the optical frequency can be proportional to the drive current i(t) due to carrier-density changes. This leads to frequency modulation or chirp of the DML output. The frequency change Δf(t) can be written as:

$$\Delta f(t) = \gamma \Delta i(t) \quad (1)$$

where γ is the FM chirp coefficient. For example, for distributed feedback (DFB) lasers operating at about 1.55 μm, a typical fast FM chirp coefficient γ is about −250 MHz/mA, though this coefficient can vary significantly based on the laser design. For example, the FM chirp coefficients can be in the range of about 200 MHz/mA to about 400 MHz/mA.

Direct modulation can result in a phase change Δϕ for a given symbol with duration $\tau_{sym}$:

$$\Delta\phi = 2\pi \int_0^{\tau_{sym}} \Delta f(t)dt \int \Delta f(t)dt = 2\pi\gamma \int_0^{\tau_{sym}} \Delta i(t)dt \quad (2)$$

Equation (2) shows that the drive current amplitude can be adjusted to achieve the desired phase change, which is 0 or π for DPSK. At full rate, the carver (e.g., temporal filter 124 in FIG. 1) can perform two functions: 1) passing the optical signal waveform near the end of the symbol where the integrated optical phase has largely converged; and 2) removing a potentially unnecessary transition region at the beginning of the symbol, which may include phase and/or power fluctuations that can degrade performance. On the receiving end, a delay line interferometer (DLI) can demodulate the received signal based on the relative phase difference Δϕ of two adjacent symbols.

FIGS. 2A and 2B show that the current-driven DML can be used for multiple types of modulation (e.g., amplitude modulation, frequency modulation, and phase modulation). Therefore, DML can be used to construct a multi-format transmitter like the apparatus 100 shown in FIG. 1. For example, the laser 110 in the apparatus 100 can include a current-driven DML to implement different encoding schemes, such as On-Off Keying (OOK), M-ary Pulse Position Modulation (M-PPM), Mary Frequency Shift Keying (M-FSK), PoLSK Polarization-shift keying, M-ary orthogonal, and M-Differential Phase Shift Keying (M-DPSK). This reconfigurability can significantly improve the flexibility of the resulting system. For example, in space-to-ground communication, this multi-format transmitter can be launched to the space that has higher constraints on the SWaP of the payload. Depending on the receivers on the ground or any other situations, the transmitter can be configured to communication with the ground using different encoding schemes.

Figure 3:
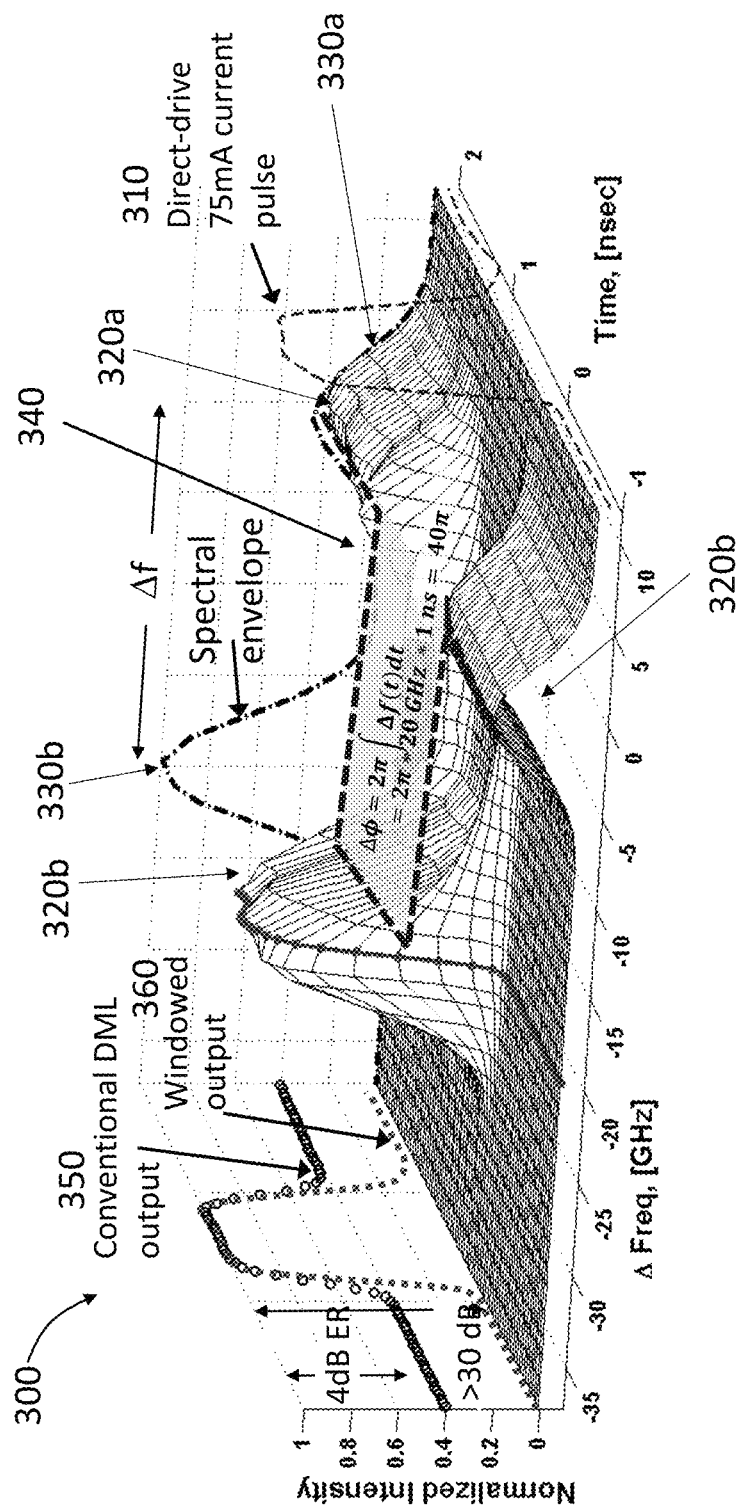
FIG. 3 shows a time-frequency spectrogram illustrating time, frequency, and phase changes in a directly-driven laser in response to a drive current pulse.

FIG. 3 shows a time-frequency spectrogram 300 illustrating time, frequency, and phase changes in a directly-driven laser in response to a drive current pulse. In the spectrogram 300, a drive current 310 having an amplitude of about 75 mA and width of about 1 ns is used to drive a DML. Three pulses 320a, 320b, and 320c are emitted by the DML. The first pulse 320a and the third pulse 320c are emitted before and after the drive pulse 310, respectively, while the second pulse 320b is emitted in response to the drive pulse 310. In the spectral domain, the first pulse 320a and the third pulse 320c have the same spectral envelop 330a, and the second pulse 320b has a different spectral envelop 330b, which is spectrally shifted from the spectral envelop 330a by $\Delta f$ (i.e. about 20 GHz in FIG. 3).

FIG. 3 also shows a temporal envelope 340 of the three pulses 320a to 320c. The temporal envelop 340 clearly shows that the end of the second pulse 320b has an accumulated phase shift of about $40\pi$ with respect to the first pulse 320a (as well as the third pulse 320c). As shown in equation (2), the drive current 310 can be configured to change the amount of phase shift. In this case, the amplitude of the drive current 310 can be reduced by 40 fold (e.g., to about 1.9 mA) to introduce a phase shift of about $\pi$.

The conventional output of the DML is illustrated by an envelope 350, which shows that the output has an ER of about 4 dB. In some examples, a spectral filter (e.g., 122 in FIG. 1) can be used to improve the ER. For example, the spectral filter can have a pass band centered at about −20 GHz with a steep transition to an extended null centered near 0 GHz. This can generate a windowed output 260 having an ER greater than 30 dB.

Figure 4A:
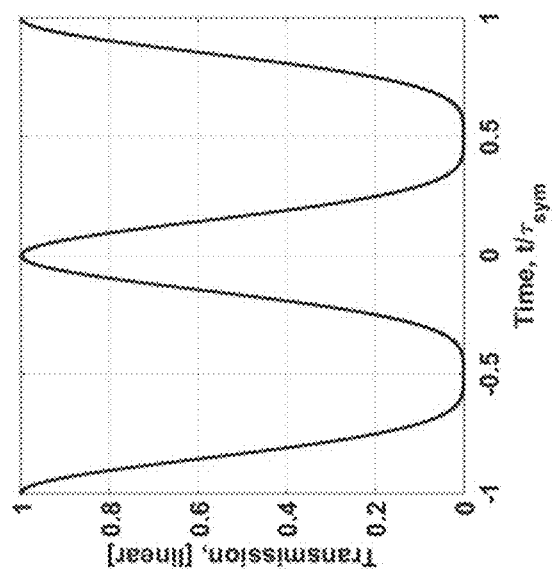
FIG. 4A shows a pulse-carving waveform for a temporal filter that can be used in the apparatus shown in FIG. 1.

FIG. 4A shows a waveform of a drive signal to drive a temporal filter (e.g., temporal filter 124 in FIG. 1) that can be used for optical transmitters. The waveform has a narrow-band sinusoidal shape to generate high-fidelity waveforms with moderate power consumption (e.g., less than 0.5 W). The duty cycle of the drive signal can be substantially equal to or less than 50% (e.g., about 50%, about 45%, about 40%, about 35%, about 30%, about 25%, about 20%, or less, including any values and sub ranges in between). This low duty cycle can provide more time for DML-based phase-modulation transitions to converge (i.e. accumulate a desired amount of phase shift by the end of the drive signal). The low duty cycle can also provide more time for the burst-off pulses to transition from positive to negative half-cycles.

Figure 4B:
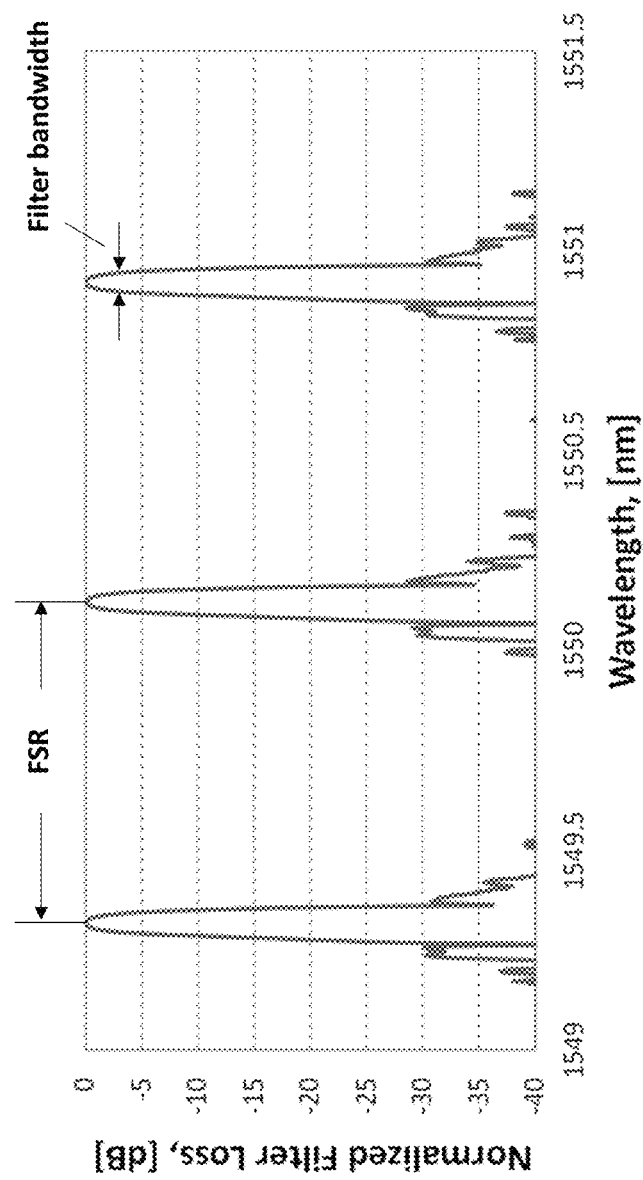
FIG. 4B shows transmission of a spectral filter that can be used in the apparatus shown in FIG. 1.

FIG. 4B shows transmission spectrum of a spectral filter that can be used in the apparatus shown in FIG. 1. The transmission spectrum includes a periodic array of transmission peaks separated by a free spectral range (FSR), also referred to as filter periodicity. Each transmission peak is characterized by a filter bandwidth. The FSR can set the minimum WDM channel spacing. For the transmission spectrum shown in FIG. 4B, the FSR is about 0.8 nm (or equivalent to about 100 GHz in frequency). The filter bandwidth can be less than about three times the modulation rate, depending on the desired ER, to achieve power-efficient intensity and phase modulation. The transmission spectrum in FIG. 4B has a filter bandwidth of about 5 GHz. The spectral filter can also be characterized by a filter shape, which can have a relatively flat passband and steep role-off in order to reject out-of-band FM-modulation that results from the DML process. In order to avoid filter ring-down issues, sharp passband edges can be avoided. Examples of the filter shape can be Gaussian or Gaussian-like with a narrow time-bandwidth product.

Figure 4C:
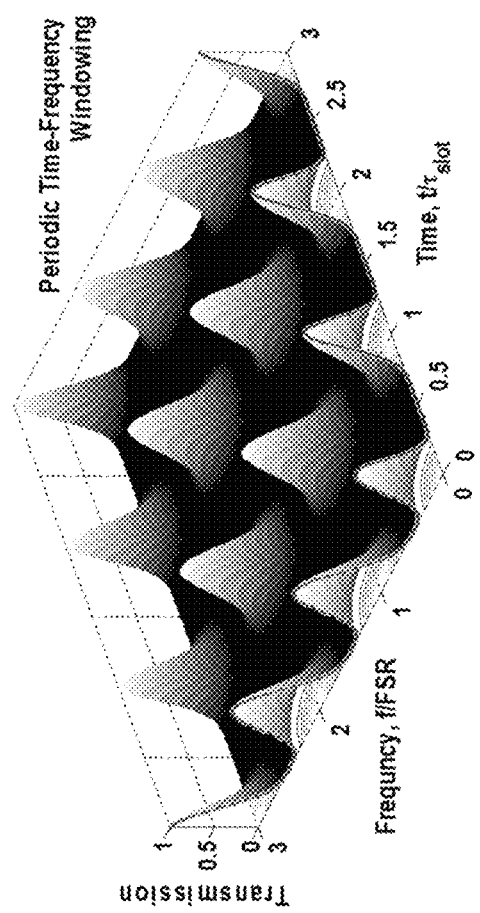
FIG. 4C shows time and frequency domain characteristics of a periodic spectral-temporal filter that can be used in the apparatus shown in FIG. 1.

FIG. 4C shows time and frequency domain characteristics of a periodic spectral-temporal filter that can be used in the apparatus shown in FIG. 1. The time and frequency domain characteristics are also referred to as spectral-temporal filtering transmission, which shows the 2-dimensional transfer function resulting from the periodic pulse carving (with period $t_{slot}$) on the time axis, periodic spectral filtering (with period FSR) on the frequency axis, and the aggregate "eggshell-shaped" transmission magnitude on the vertical axis.

Methods for Power Efficient Optical Transmission

Figure 5:
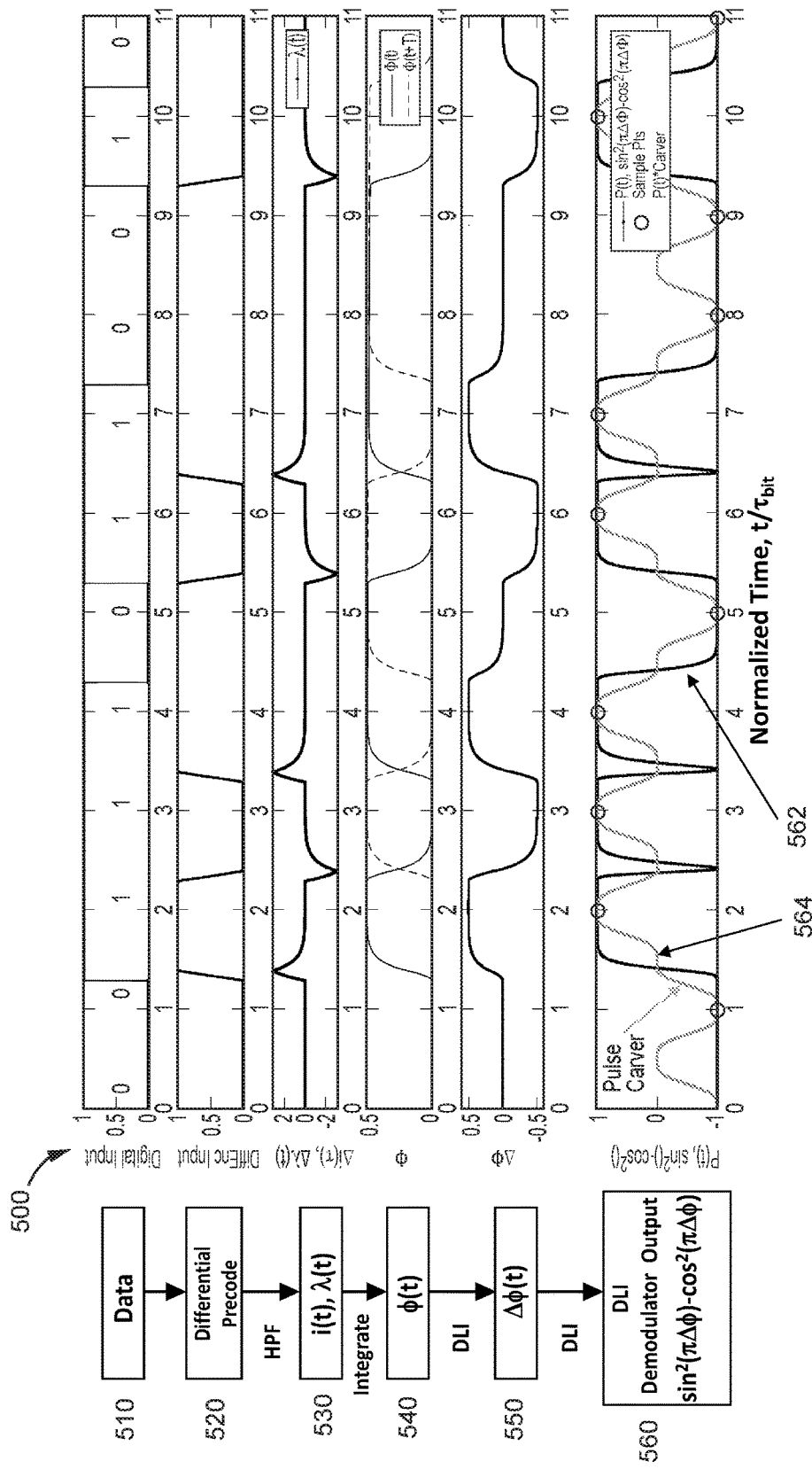
FIG. 5 illustrates a method of generating a processed optical signal that can be used for optical communication using DPSK.

FIG. 5 illustrates a method 500 of generating and receiving DPSK data waveforms using DMLs and time-frequency filtering. In the method 500, digital input data 510 is differentially pre-coded to generate pre-coded data 520. The pre-coding can also pre-compensate for the differential demodulation process on the receiving end. The pre-coded data 520 is then converted into a drive signal 530 i(t) (e.g., using the driver 140 in FIG. 1) that directly modulates the output phase shift of a laser. High-pass filtering or digital processing may be used to perform differentiation on the pre-coded waveform 520 to produce the AC-coupled 3-level pulsed DML-drive signal current waveform i(t) 530. The drive signal 530 can generate a phase profile $\phi(t)$ 540. The phase shift $\Delta\phi(t)$ between adjacent symbols can be acquired and demodulated by a DLI on the receiving end 560. A demodulated signal can be calculated as $\sin^2(\pi\Delta\phi) - \cos^2(\pi\Delta\phi)$.

FIG. 5 also shows the effect of the pulse carver (e.g. 124 in FIG. 1) on the demodulated signal. The demodulated signal without the pulse carver has a waveform 562 and the demodulated signal with the pulse carver has a waveform 564. It can be seen from FIG. 5 that the pulse carver has the effect of attenuating the transition regions (between valley and peak) in the waveform 562. This carving can reduce power and/or phase fluctuations in the signal.

Figure 6A:
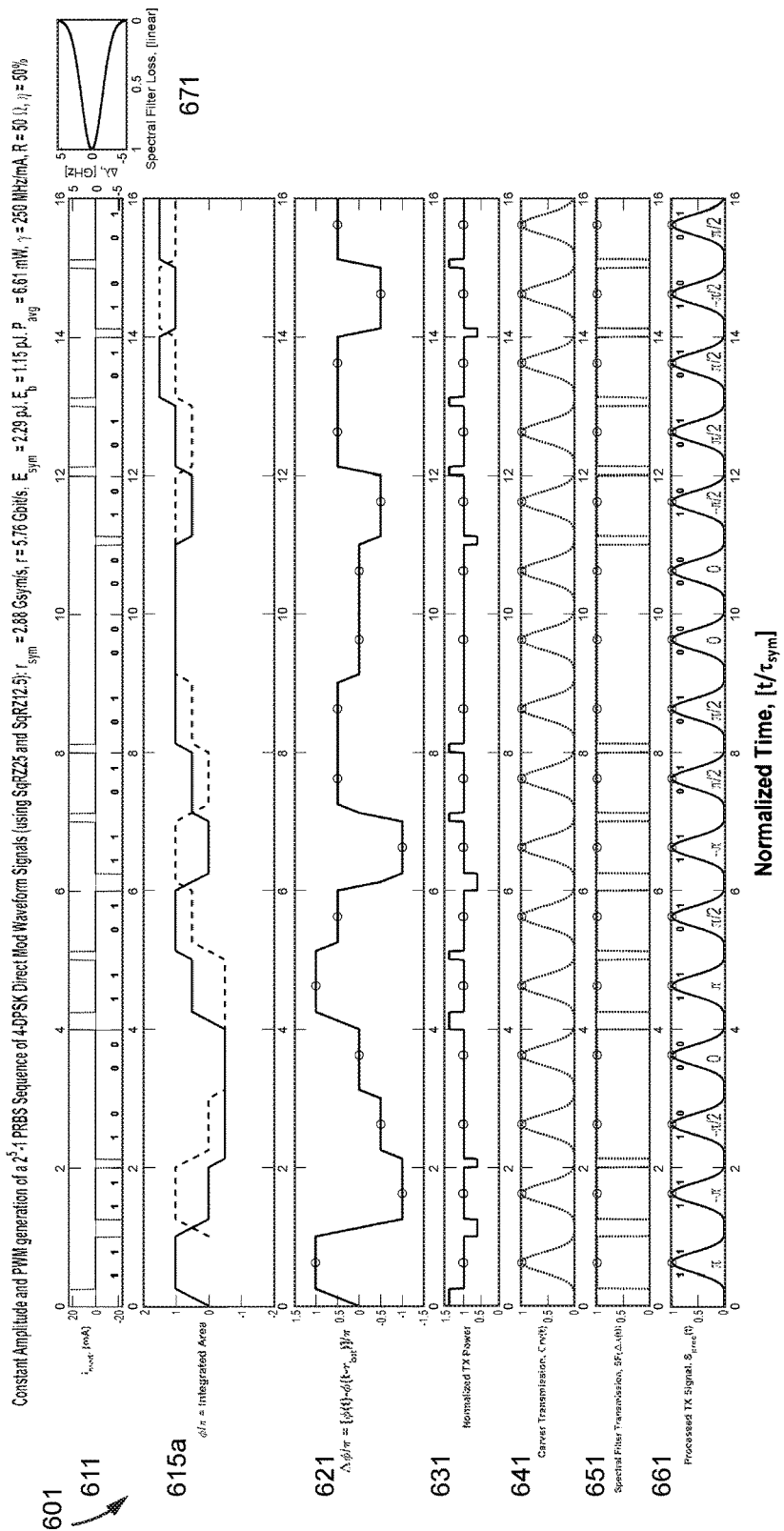
FIGS. 6A-6D show sequences of waveforms for generating 2-DPSK and 4-DPSK symbol sets using directly modulated lasers (DMLs).

FIG. 6A shows a sequence of waveforms 601 for generating a 4-DPSK symbol set driven by a drive waveform imod(t) 611. The integrated area 615a of the drive waveform 611 is also shown in FIG. 6A. The resulting phase changes $\Delta\phi(t)$ 621 include four values $\{0, \pi/2, -\pi/2, \text{and } \pi\}$. Normalized TX power 631 as a function of time illustrates the optical signal prior to spectral-temporal filtering (e.g. the first optical signal 101 in FIG. 1). The temporal filter used in the spectral-temporal filtering has a transmission characterized by a Gaussian-shaped carver waveform Crv(t) 641. The spectral filter in the spectral-temporal filtering has a transmission profile $SF(\Delta\lambda(t))$ 651, which can be characterized by a pass band having a width that is about 1.5 times the symbol rate (2.88 GHz shown in FIG. 6A). The product of the Normalized TX Power Crv(t) 641, and SF(Δλ(t)) 651 yields the envelope of the processed optical signal Sproc(t) 661, which samples and transmits the phase information Δλ(t). FIG. 6A also shows the spectral filter shape 671 relative to the DML-induced FM modulation. The product of phase changes Δϕ(t) 621 and filter transmission 671 yield the spectral filter transmission 651.

Figure 6B:
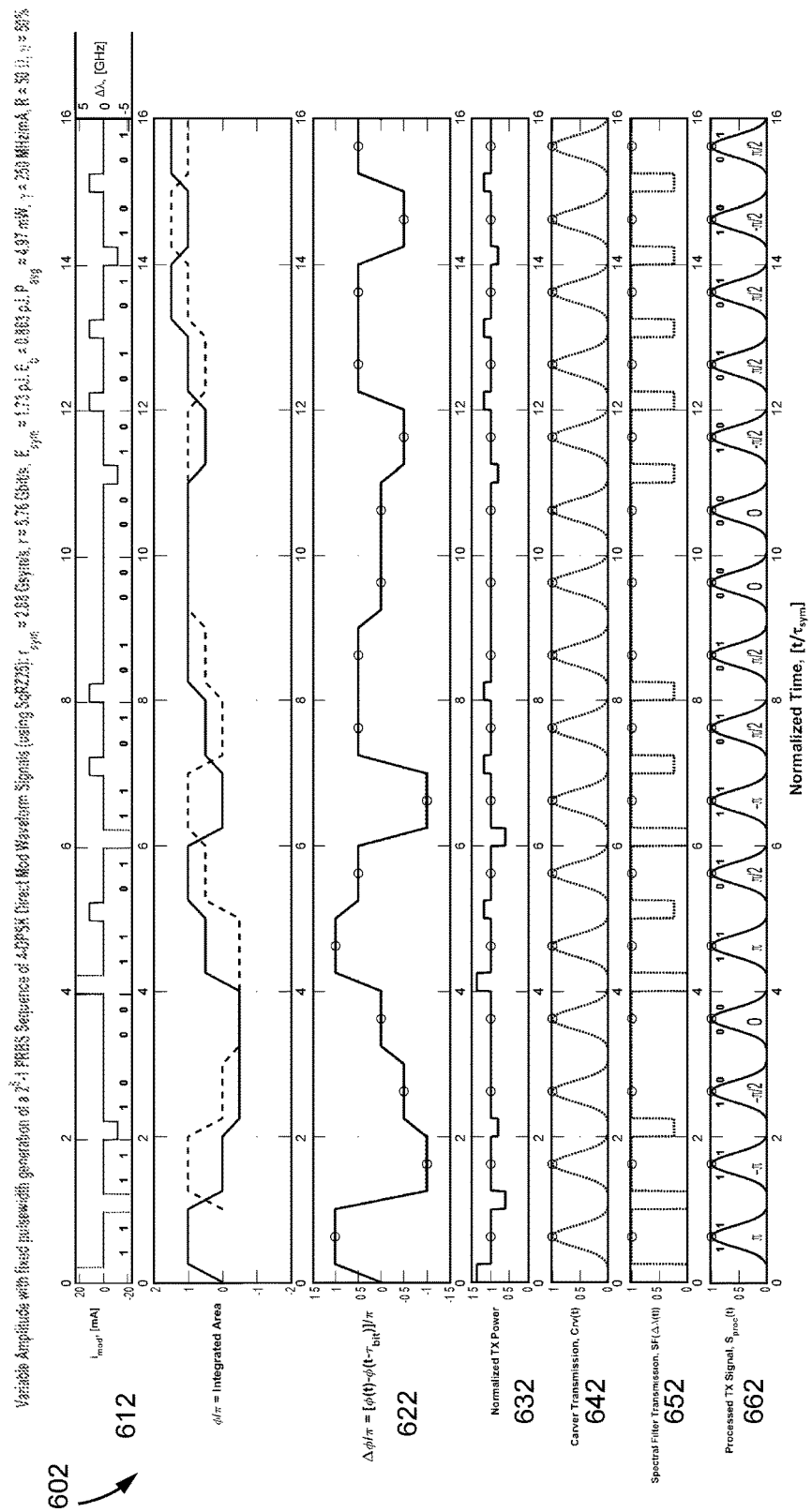

The modulation in FIG. 6A uses constant amplitude and pulse width modulation (PWM). FIG. 6B shows a sequence of waveforms 602 for generating a 4-DPSK symbol set. The sequence of waveforms 602 for generating a 4-DPSK symbol set is driven by a pulse-amplitude-modulated (PAM) 5-state waveform $i_{mod}(t)$ 612. The corresponding Δλ(t) shows a simulated frequency modulation change resulting from the drive signal 612. The resulting phase changes 622 Δϕ(t)={0, π/2, −π/2, and ±π} are shown below, along with normalized transmitter power 632 as a function of time, which shows the optical signal prior to T-F processing. The transmission characteristics of an example T-F filter are also shown, for a Gaussian-shaped carver waveform Crv(t) 642, and the transmission 652 of the frequency modulated optical signal Δλ(t) through a Gaussian optical spectral filter with a pass band that is about 1.5 times the symbol rate (simulated here at 2.88 GHz). The product of the Normalized TX Power 632, Crv(t) 642, and SF(Δλ(t)) 652 yields the envelope of the processed first TX optical signal, $S_{proc}(t)$ 662, which samples and transmits the phase information Δϕ(t).

Figure 6C:
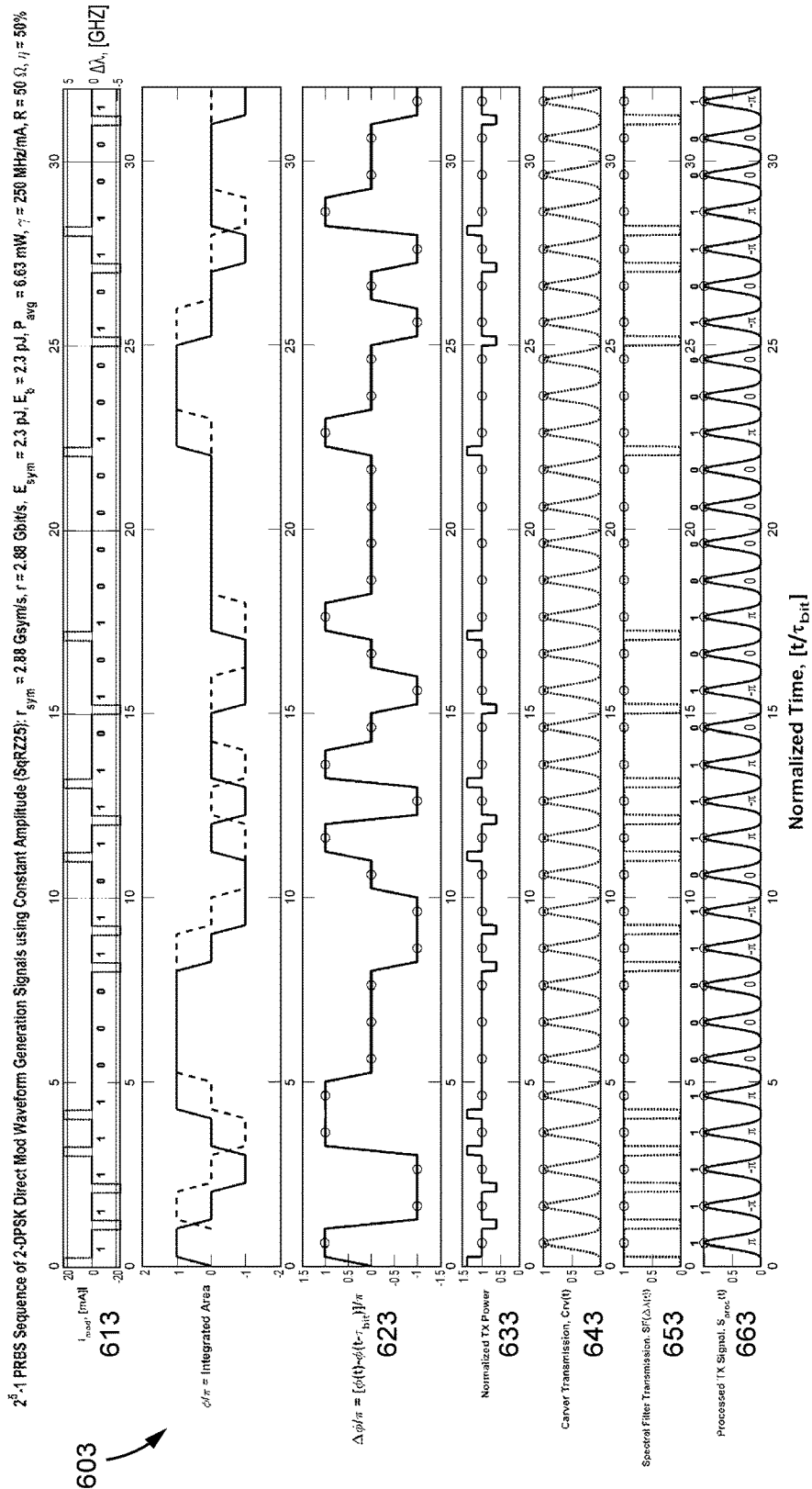

FIG. 6C shows DML-DPSK waveforms 603 for generating 2-DPSK modulation using SqRZ25 pulses. A sinusoidally driven carver is configured to generate periodic Gaussian-like RZ33 transmission windows. The waveforms 603 include a drive signal 613 to generate phase change waveform 623, normalized transmitter power 633, carver waveform 643, spectral transmission 653, and processed signal waveform 663.

Figure 6D:
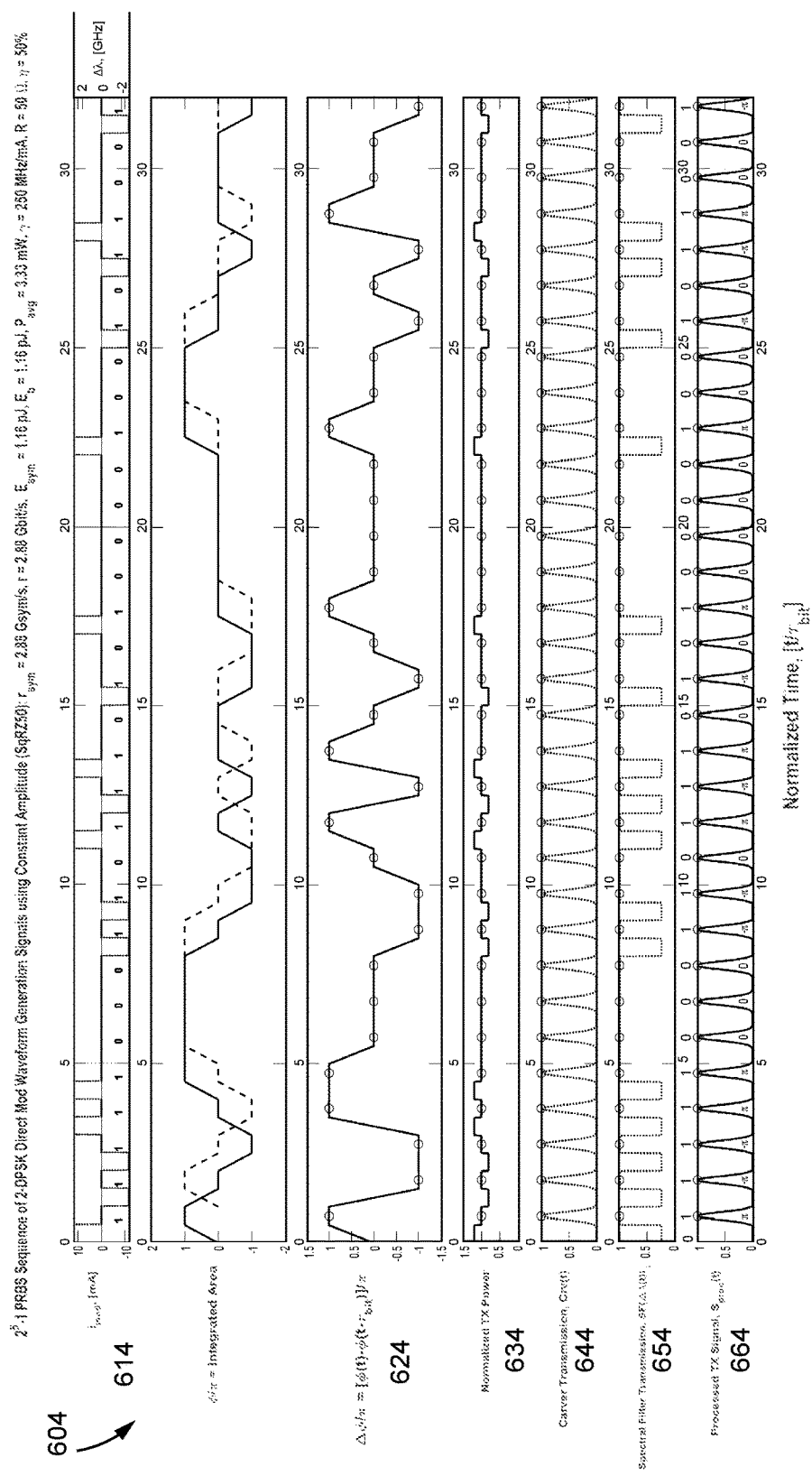

FIG. 6D shows DML-DPSK waveforms 604 for generating 2-DPSK modulation using SqRZ50 pulses. The sinusoidally driven carver is configured to generate periodic narrower RZ25 transmission windows that fit better within the stable plateau region between phase and intensity transitions resulting from the DML modulation, and provide an improved sample of the DML TX output waveforms. The waveforms 604 include a drive signal 614 to generate phase change waveform 624, normalized transmitter power 634, carver waveform 644, spectral transmission 654, and processed signal waveform 664.

Figure 6E:
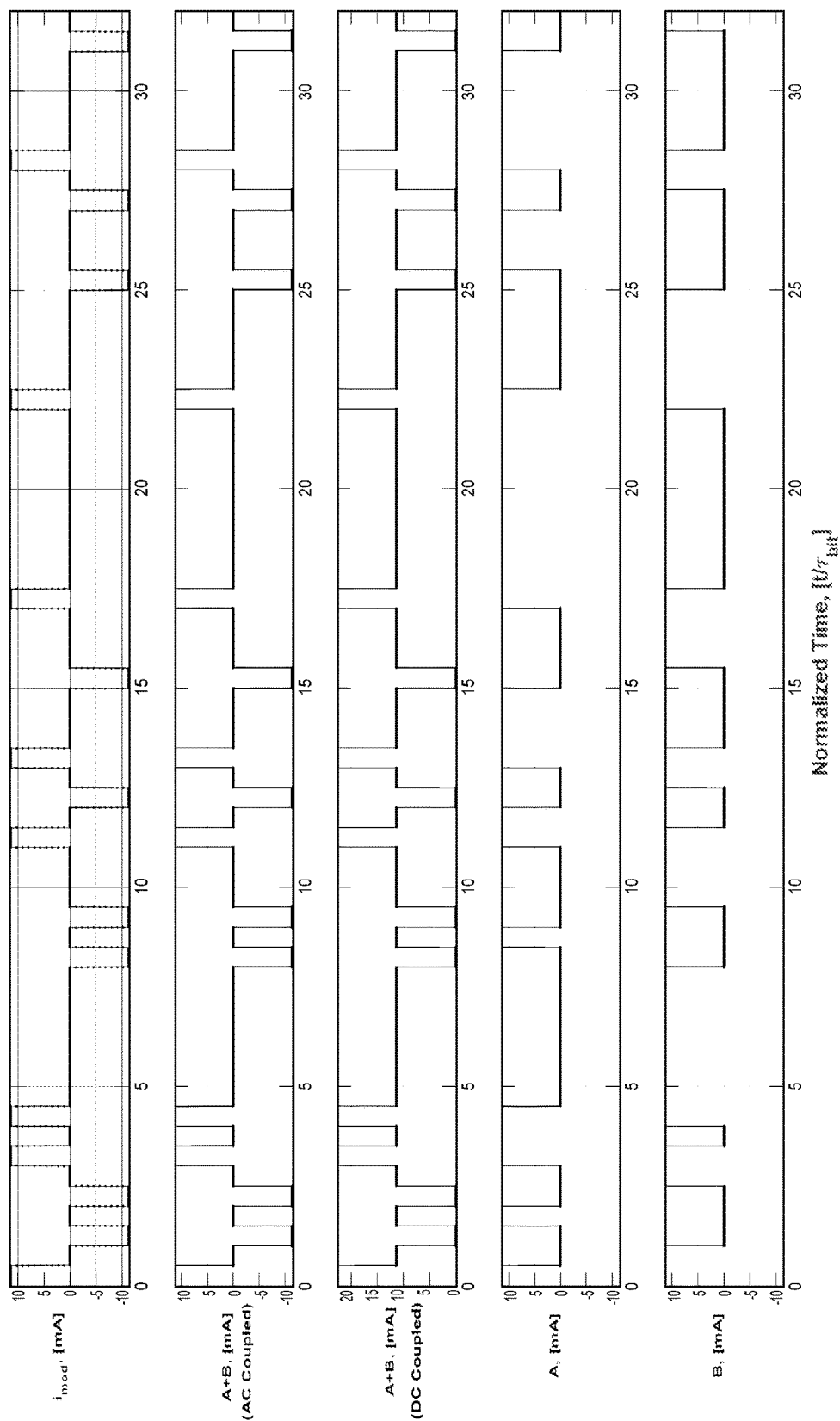
FIGS. 6E-6G show sequences of waveforms that can be summed to create a drive signal for generating 2-DPSK and 4 DPSK symbol sets using directly modulated lasers (DMLs).
Figure 6F:
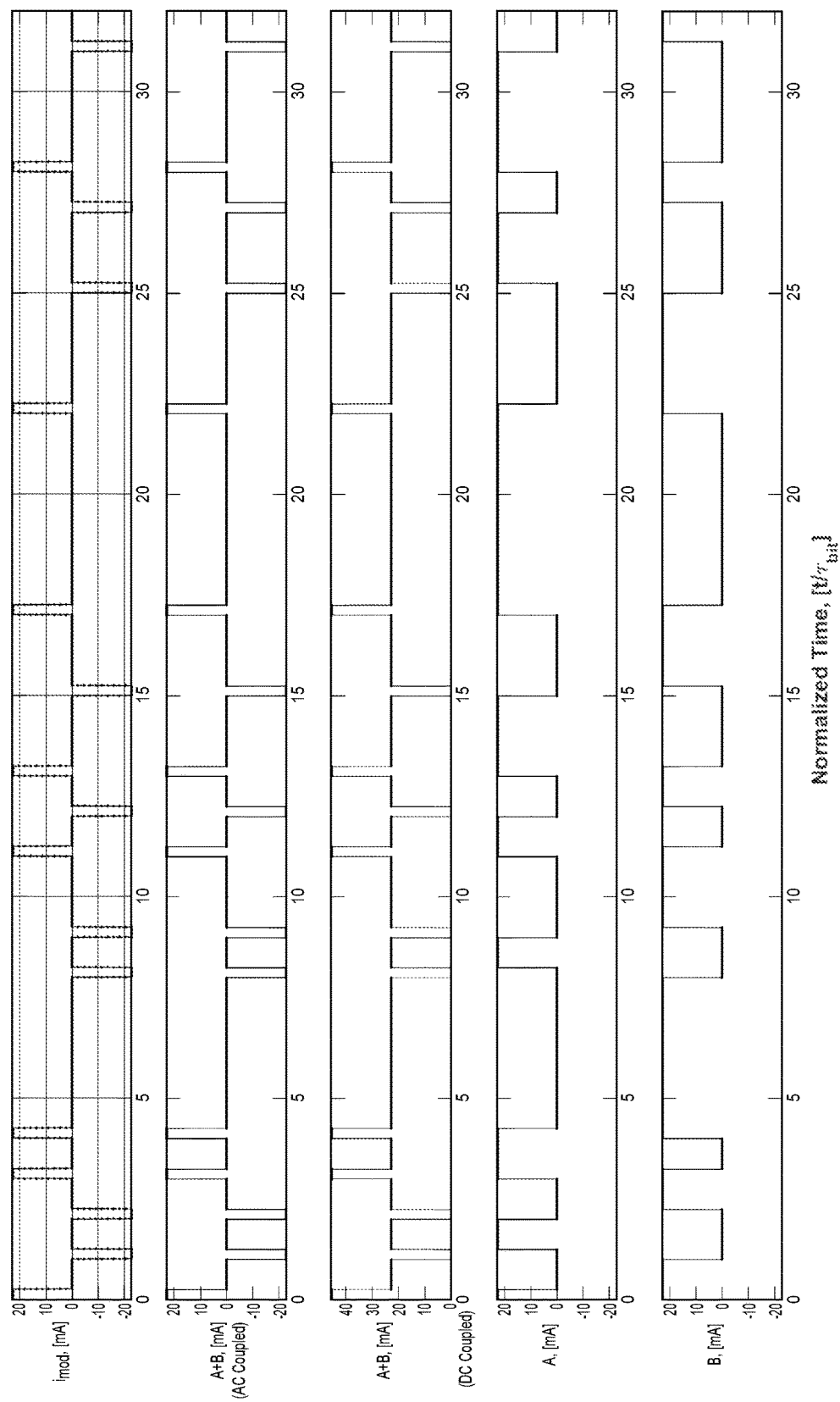
Figure 6G:
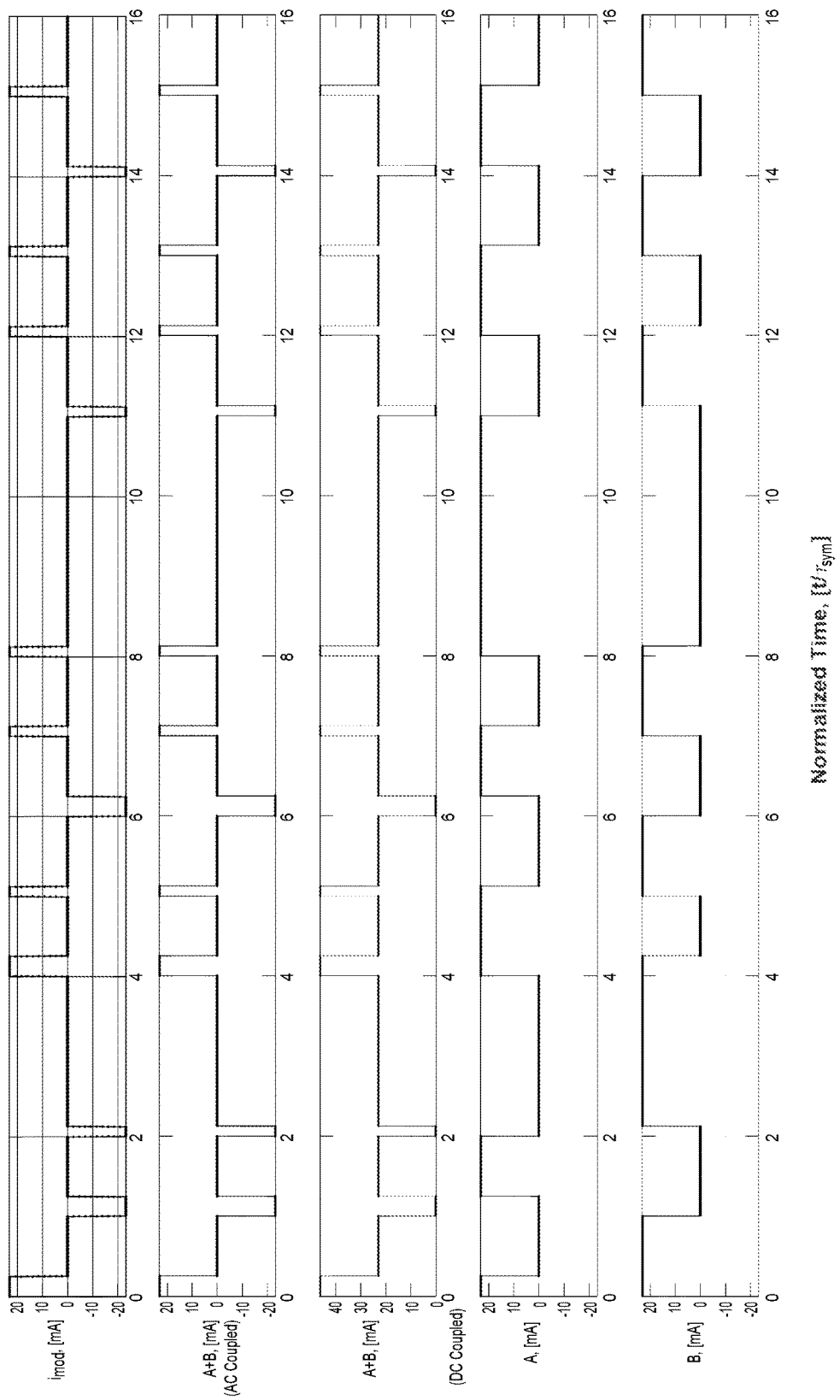

FIGS. 6E-6G show sequences of waveforms that can be summed to create a drive signal for generating 2-DPSK and 4 DPSK symbol sets using directly modulated lasers (DMLs). FIG. 6E illustrates generation of SqRZ50 pulses using the addition of two digital signal waveforms A and B. The DC component of the addition waveform A+B may be straightforwardly removed via AC coupling. The $i_{mod}$ waveform (top) mirrors the AC coupled A+B waveform, and this can be the same as the drive waveform used to generate the DML 2 DPSK optical signals shown in FIG. 6D.

FIG. 6F illustrates generation of SqRZ25 pulses using the addition of two digital signal waveforms A and B. The DC component of the addition waveform A+B may be straightforwardly removed via AC coupling. The $i_{mod}$ waveform (top) mirrors the AC coupled A+B waveform, and this can be the same as the drive waveform used to generate the DML 2-DPSK optical signals shown in FIG. 6C.

FIG. 6G illustrates generation of pulse width modulated (PWM) SqRZ25 and SqRZ12.5 pulsed waveforms using the addition of two digital signal waveforms A and B. The DC component of the addition waveform A+B may be straightforwardly removed via AC coupling. The $i_{mod}$ waveform (top) mirrors the AC coupled A+B waveform, and this can be the same as the drive waveform used to generate the DML 4-DPSK optical signals shown in FIG. 6A.

Wavelength Division Multiplexing (WDM) of DML-Based Optical Communication

Figure 7:
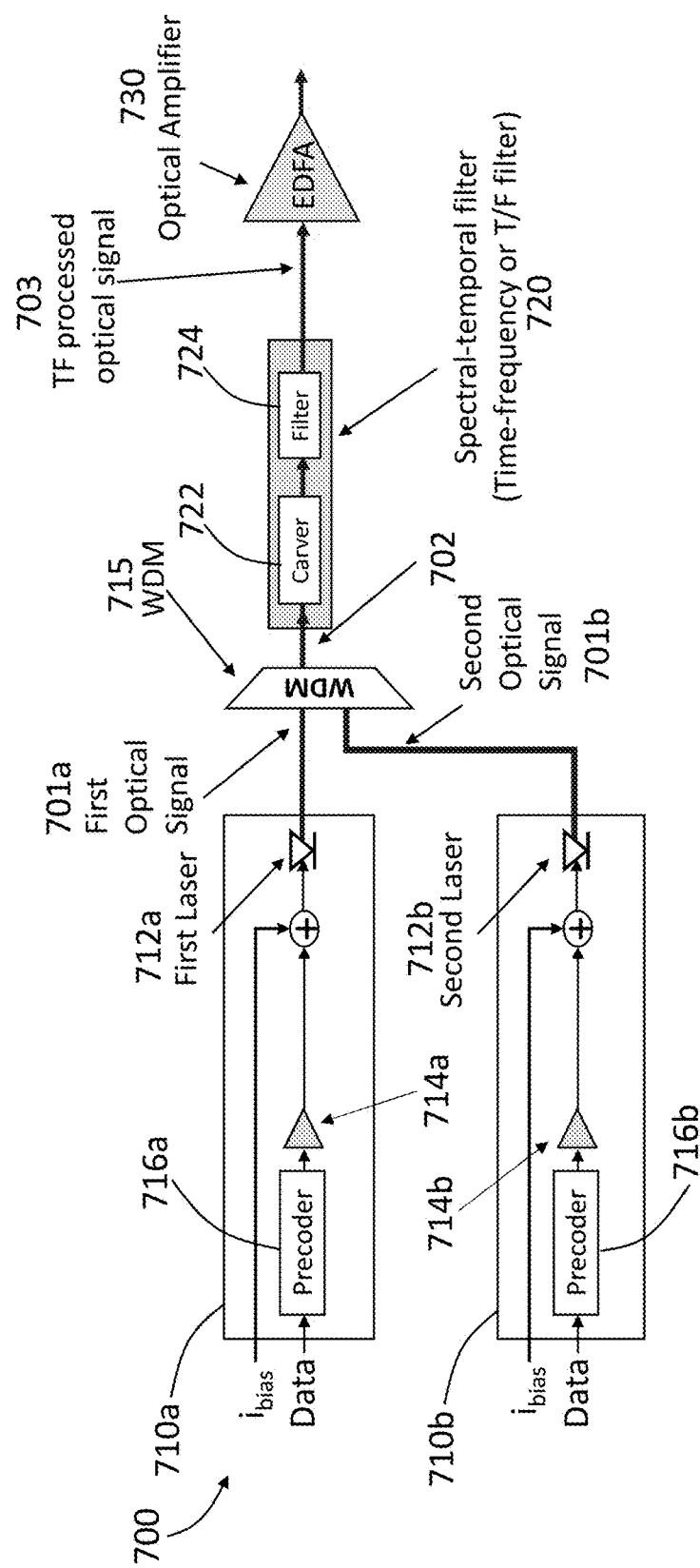
FIG. 7 shows a schematic of an apparatus for wavelength division multiplexing (WDM) optical communication using DMLs and time-frequency filtering.

FIG. 7 shows a schematic of an apparatus 700 with WDM capability for DML-based optical communication. The apparatus 700 includes a first wavelength channel 710a to emit a first optical signal 701a at a first carrier wavelength and a second wavelength channel 710b to emit a second optical signal 701b at a second carrier wavelength different from the first carrier wavelength. The first wavelength channel 710a includes a first laser 712a driven by a driver 714a, which is operably coupled to a pre-coder 716a. The pre-coder 716a receives data and converts the data into a first pre-coded signal for the first driver 714a to generate the first drive signal. Similarly, the second wavelength channel 710b includes a second pre-coder 716b to generate a second pre-code signal for a second driver 714b to generate a second drive signal. The second drive signal drives a second laser 712b to emit the second optical signal 701b.

The first optical signal 701a and the second optical signal 701b are multiplexed by a multiplexer 715 to generate a multiplexed signal 702, which is directed to a spectral-temporal filter 720. The spectral-temporal filter 720 includes a spectral filter 729 to modulate the spectral profile of the multiplexed signal 702 and a temporal filter 722 to modulate the temporal profile of the multiplexed signal 702. The output 703 of the spectral-temporal filter 720 is sent to an optional amplifier 730 for amplification before being directed to an optical network.

FIG. 7 shows only two channels 710a and 710b for illustrative purposes only. In practice, multiple wavelength channels can be used (e.g., 3 channels, 5 channels, 10 channels, 20 channels, 30 channels, or more, including any values and sub ranges in between). In one examples, all the channels can share the same spectral-temporal filter 720 to construct a compact transmitter. In another example, a first subset of channels can share a first spectral-temporal filter and a second subset of channels can share a second spectral-temporal filter.

Multi-Rate Optical Communications

Multi-rate optical communication (also referred to as burst-mode communication) can lower the effective data rate by introducing extended periods of dead time in between data packets. Modulation extinction ratio (ER) in this case can be defined as $$ER = \frac{\text{Power Off}}{\text{Power On}}, (0 < ER \le 1).$$

It can be helpful for communications to have low duty cycle (DC, 0<DC≤1) waveforms in order to avoid TX power-robbing penalties, i.e. the power during the dead time (off time) is small compared to the power during the on-time. The power-robbing penalty can be limited to about 0.3 dB when the condition |ER|>|DC|+15 dB is met, meaning that the |ER| can be large (about 15 dB or a factor of 30) relative to the duty cycle.

DML-based burst-windowing can be implemented using a dynamic approach that maintains the unmodulated TX carrier wavelength ($\lambda_c$) and avoids substantial RX penalties due to misalignment with the DLI that can arise from slower thermal changes during the long burst-off duration. The TX time-frequency window can be aligned such that one of the periodic optical filter passbands is substantially centered at $\lambda_c$. During the dead time, an alternating series of short burst-off current signals push and pull the TX wavelength out of the filter passband. Except for the short transition time when the TX wavelength slews through the filter passband, the TX wavelength resides outside the filter passband and can be adjusted so that the average TX wavelength remains at $\lambda_c$. Here, the time-windowing carver can be configured to remove the transients by synchronizing the filter pass-band transitions to align with the carver off-time. In this manner, the burst-off drive waveforms in conjunction with time-frequency windowing are able to reject the DML signal, providing good dead-time extinction without shifting the TX wavelength.

FIG. 8A shows a schematic of an apparatus 800 for multi-rate optical communication. The apparatus 800 includes a laser 810 operably coupled to a data driver 840 and a burst-off driver 850. The data driver 840 generates a drive signal to drive the laser 810 based on pre-coded data provided by a DPSK encoder 860, which receives data to be transmitted by the apparatus 800. The burst-off driver 850 is configured to generate a burst-off signal that can cause the laser 810 to emit light at wavelengths outside the passband of a spectral-temporal filter 820 (similar to the spectral-temporal filter 120), which includes a spectral filter 822 and a temporal filter 824. The apparatus 800 can also include a high-pass filter (HPF) 845 to filter the drive signal from the data driver 840. In addition, an amplifier 830 can also be used to amplify the optical signal after the spectral-temporal filter 820. Although the data driver 840 and the burst-off driver 850 are shown as separate devices in FIG. 8A, in practice, a single driver can be used to generate both the drive signal and the burst-off signal.

The operation of the apparatus 800 can be divided into burst-on time and burst-off time. The apparatus 800 is configured to transmit data to a receiver during the burst-on time. During the burst-off time, however, the apparatus 800 is configured to transmit no data, thereby reducing the effective data rate.

FIG. 8B shows an example waveform of the drive signal provided by the data driver 840. During the burst-on time, the data driver 840 provides a drive signal to modulate the laser 810 so as to cause the laser 810 to emit optical signals with the desired power, frequency, and phase shift. During the burst-off time, the data driver 840 is nearly silent, providing no signal to affect the operation of the laser 810.

FIG. 8C shows an example waveform of the burst-off signal provided by the burst-off driver 850. During the burst-on time, the burst-off driver 850 provides no signal so as not to interfere with the drive signal provided by the data driver 840. During the burst-off time, however, the burst-off driver 850 is configured to deliver a burst-off signal having an amplitude large enough to push the output wavelength of the laser 810 beyond the passband of the spectral-temporal filter 820. Accordingly, the spectral filter 822 in the spectral-temporal filter 820 attenuates and/or blocks light emitted by the laser 810 during the burst-off time.

Figure 8F:
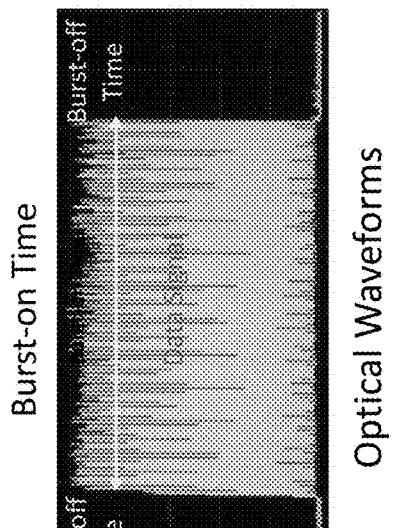
Figure 8E:
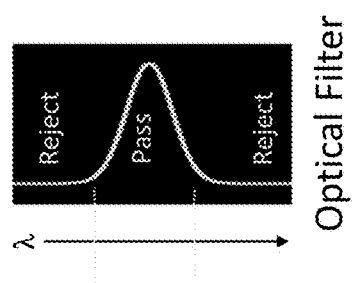
Figure 8D:
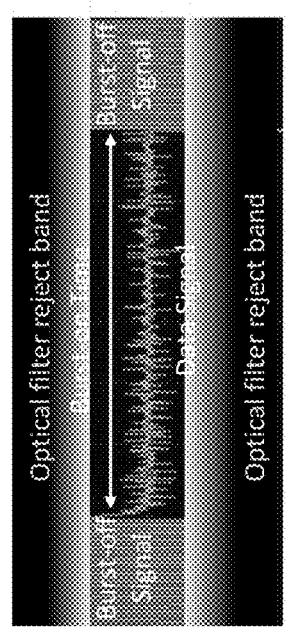

FIG. 8D shows the combined waveform of the drive signal and the burst-off signal, which affect the operation of the laser 810 together. During the burst-on time, the signal that affects the laser 810 is contributed by the drive signal, and during the burst-off time, the signal that affects the laser 810 is contributed by the burst-off signal.

FIG. 8E shows the transmission profile of the spectral filter 822. The transmission profile includes a passband having a Gaussian profile. Light at wavelengths within this passband can pass through the spectral filter 822, while light at other wavelengths are attenuated/blocked by the spectral filter 822.

FIG. 8F shows the optical waveform of the optical signal after the spectral-temporal filter 820. The optical signal has a good extinction ratio, i.e. the signal has large amplitude during the burst-on time and negligible amplitude during the burst-off time.

The apparatus 800 can be configured to transmit data within a broad range of data rates from about 1 Mbps to about 3 about Gbps (e.g. about 1 Mbps, about 2 Mbps, about 5 Mbps, about 10 Mbps, about 20 Mbps, about 50 Mbps, about 100 Mbps, about 200 Mbps, about 500 Mbps, about 1 Gbps, about 1.5 Gbps, about 2 Gbps, about 2.5 Gbps, or about 3 Gbps, including any values and sub ranges in between). The duty cycle of the output signal can be about 2.5% to about 100% (e.g., about 2.5%, about 5%, about 10%, about 20%, about 30%, about 40%, about 50%, about 60%, about 70%, about 80%, about 90%, or about 100%, including any values and sub ranges in between).

Figure 9A:
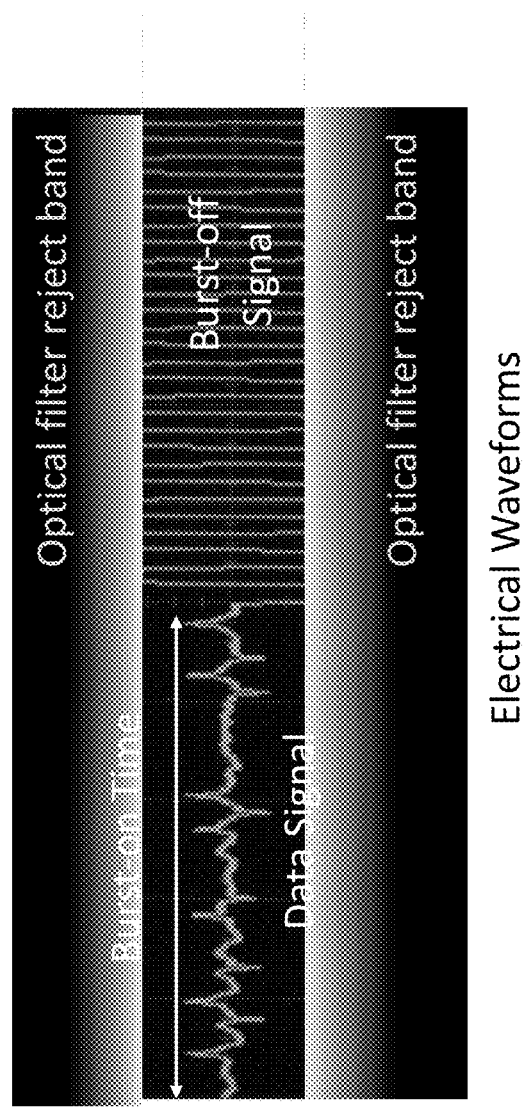
FIGS. 9A and 9B show combined waveforms of drive signals and a burst-off signals used to drive a DML in multi-rate burst-mode optical communications.
Figure 9B:
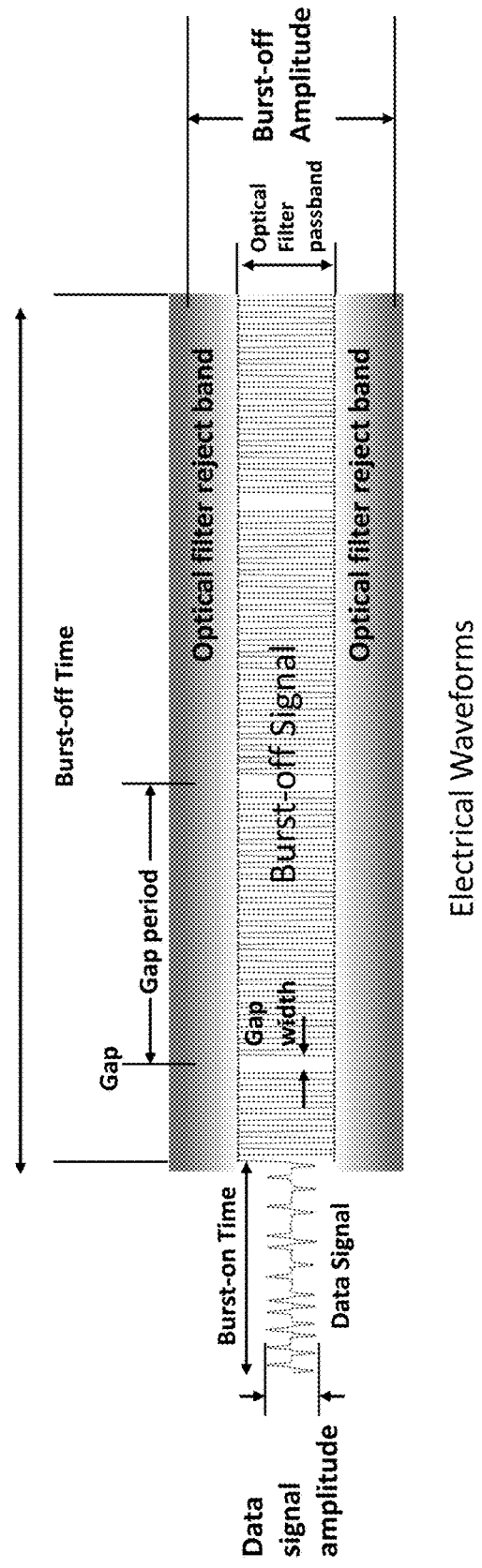

FIGS. 9A and 9B show combined waveforms of drive signals and a burst-off signals used to drive a DML in multi-rate burst-mode optical communications. FIG. 9A shows a magnified view of the combined waveform of the drive signal and the burst-off signal. In some examples, the burst-off signal can have a sinusoidal shape oscillating between positive half-cycles and negative half-cycles. In some other examples, each cycle in the burst-off signal can be asymmetric with more power located in the negative half-cycle and less power located in the positive half-cycle. This configuration can be used to address possible thermal drift of the output frequency of the laser 810. In general, increasing the amplitude of the burst-off signal can increase the output frequency and decreasing the amplitude of the burst-off signal can decrease the output frequency. However, the change of the output frequency may not be linear with respect to the large change of current amplitude in the burst-off signal. For example, the large amplitude in the positive half-cycle may cause a greater frequency change compared to the frequency change caused by the amplitude in the negative half-cycle. Therefore, using burst-off signals having more power in the negative half-cycle can address this possible frequency drift.

FIG. 9B shows that the burst-off amplitude is adjusted to achieve a desired ER. A narrower passband optical filter can be used to achieve the same ER with a lower burst-off amplitude, thereby reducing burst-off drive power. Periodic gaps can be introduced into the burst-off signal to adjust the ratio of positive and negative burst-off pulses. This adjustment can compensate for thermal drift of the optical signal carrier wavelength so that good performance can be maintained after the burst-off time.

FIG. 9B also shows that the data signal amplitude and pulse width can be adjusted to achieve the desired DPSK phase shift (e.g, $\pi$, $\pm\pi/2$, etc.). By adjusting data signal duty cycle and the optical filter pass bandwidth, the data signal amplitude may be configured to be the same as the burst-off amplitude, while achieving the desired optical phase shifts and ER. In this case, both data signal and burst-off signal may be driven from the same-amplitude tri-state signal. Such a tri-state signal may be generated via a summing of two digital signals as shown in FIGS. 6E-6G.

Figure 9C:
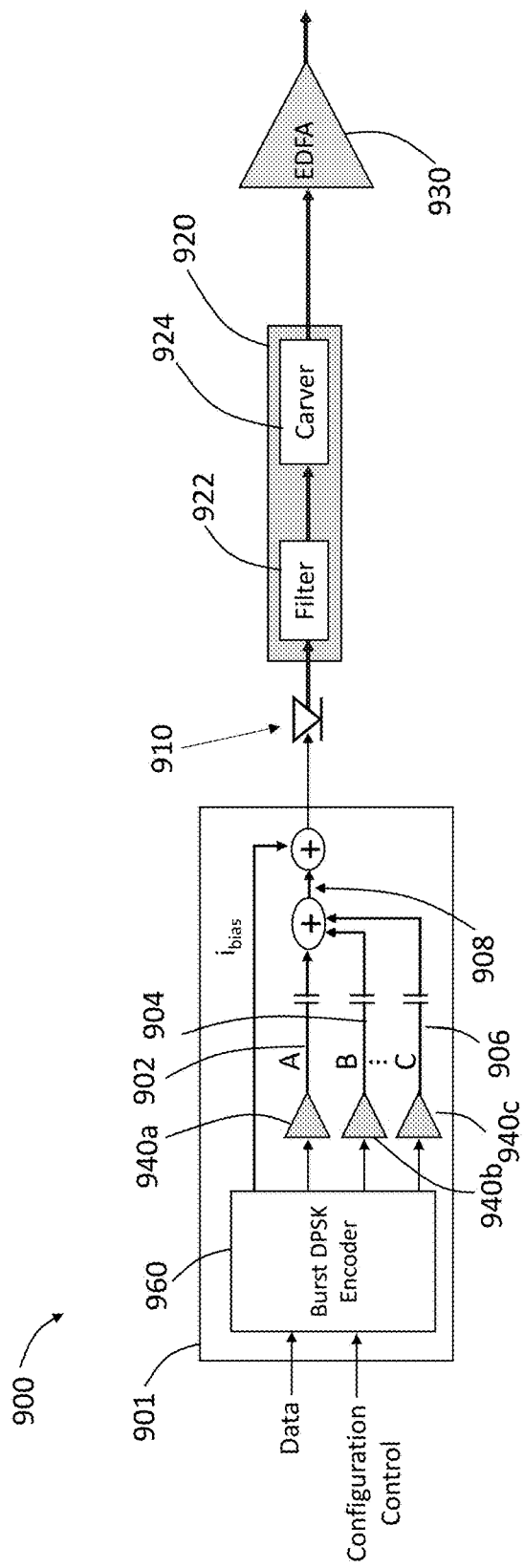
FIG. 9C shows a schematic of an apparatus for generating the combined drive signal and burst-off waveforms used to drive a DML in multi-rate burst-mode optical communications.

FIG. 9C shows a schematic of an apparatus 900 for generating the combined drive signal and burst-off waveforms used to drive a DML in multi-rate burst-mode optical communications. The apparatus 900 includes a laser 910 operably coupled to a driver module 901, which includes a burst DPSK encoder 960 to receive data and configuration control signals. Multiple drivers 940a, 940b, and 940c are configured to generate multiple signals (i.e. A, B, . . . and C) 902, 904, and 906, respectively, so that the sum 908 may be adjusted to the proper amplitude and duration to achieve the desired DPSK phase shift(s) (e.g., π, ±π/2, etc.). The sum can also be adjusted to achieve the burst off signals used for achieving the desired ER. Examples of A and B waveforms using pairs of digital signals are shown in FIGS. 6D-6G and 12A. For these examples, both data and burst signals can be generated by adjusting the phasing and on-off state of the digital signals. The output optical signal of the laser 910 is transmitted to a spectral-temporal filter 920 (similar to the spectral-temporal filter 120), which includes a spectral filter 922 and a temporal filter 924. The apparatus 900 can also include an amplifier 930 to amplify the optical signal after the spectral-temporal filter 920.

Figures 10A, 10B, 10C:
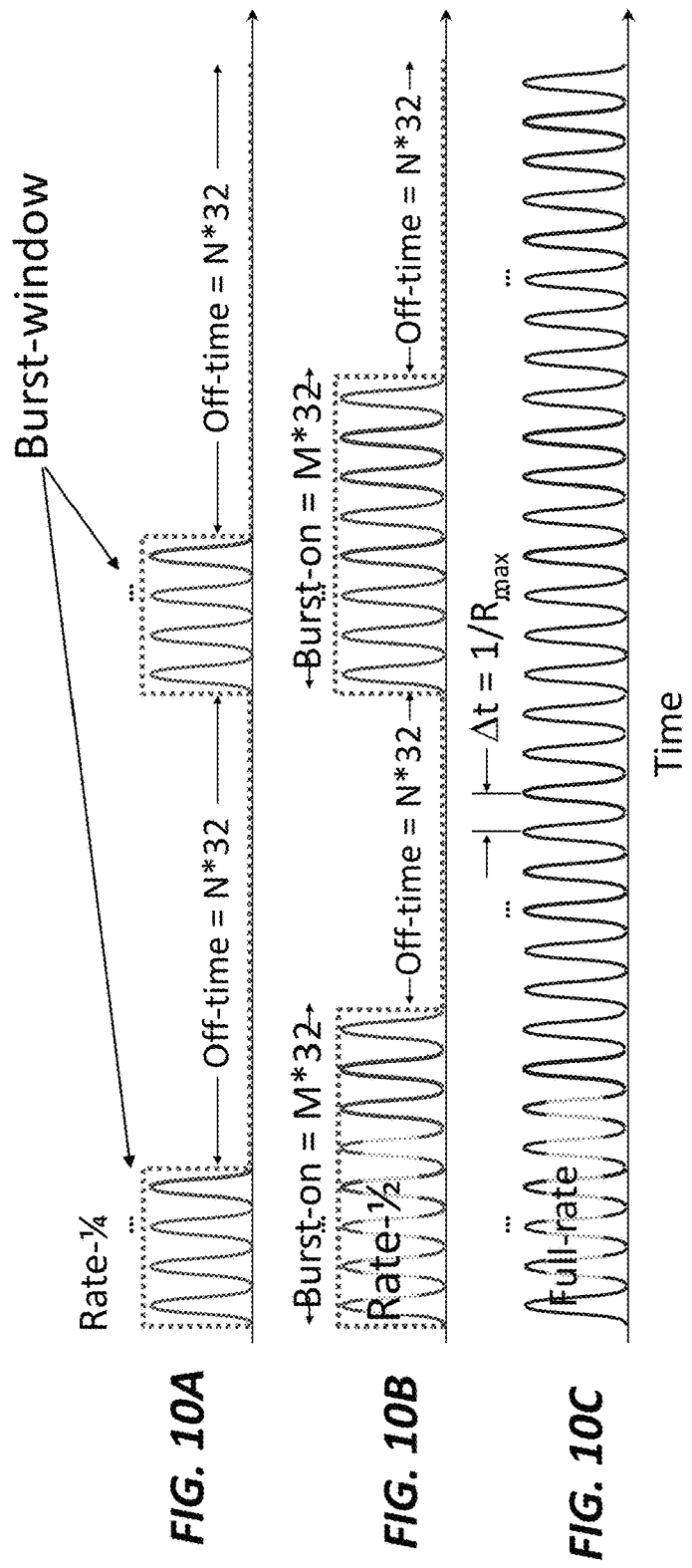
FIGS. 10A-10D show simulated optical waveforms emitted by a DML-based transmitter during multi-rate optical communications.
Figure 10D:
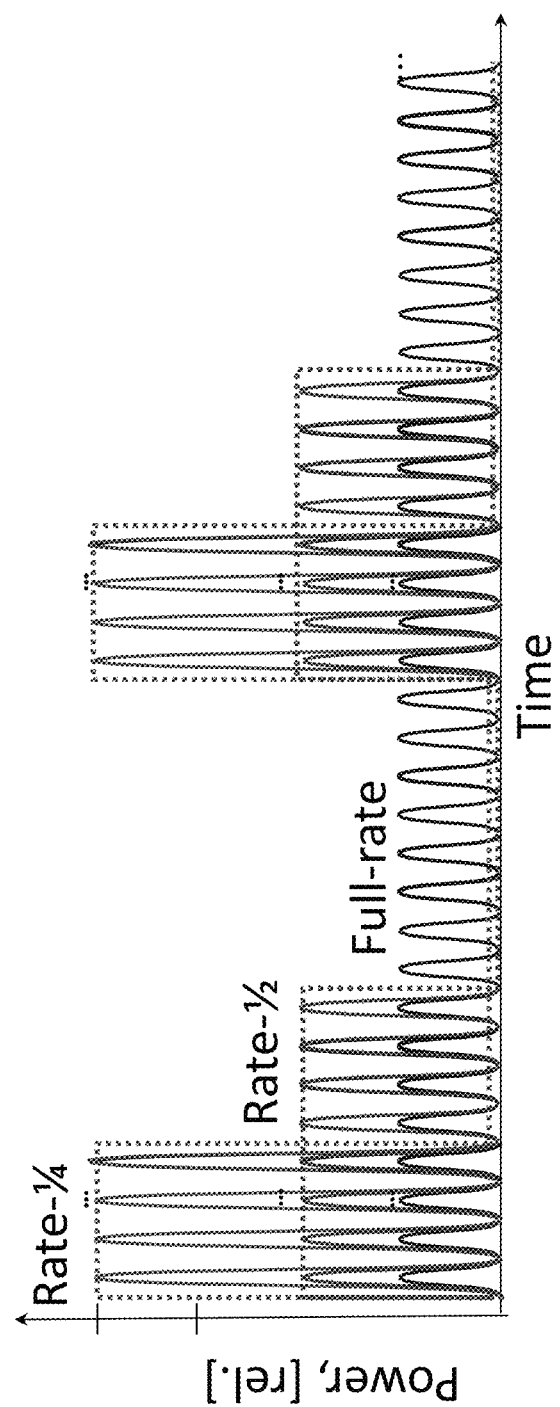

FIGS. 10A-10D show simulated optical waveforms emitted by a DML-based transmitter during multi-rate optical communications. FIG. 10A shows an optical waveform of optical signals at ¼ of the full rate, i.e. a duty cycle of 25%. FIG. 10B shows an optical waveform of optical signals at ½ of the full rate, i.e., a duty cycle of 50%. FIG. 10C shows an optical wavelength of optical signals at the full rate, i.e., a duty cycle of 100%. In each case, the waveforms show signals during the burst-on time (i.e., burst window illustrated in FIGS. 8A-8C) and show negligible amplitude during the off-time. FIG. 10D shows a combined waveform of optical signals having full rate, ½ rate, and ¼ rate delivered by a single transmitter (e.g., the apparatus 800 shown in FIG. 8A). As the data rate decreases, the amplitude of the corresponding waveform increases.

Figure 11:
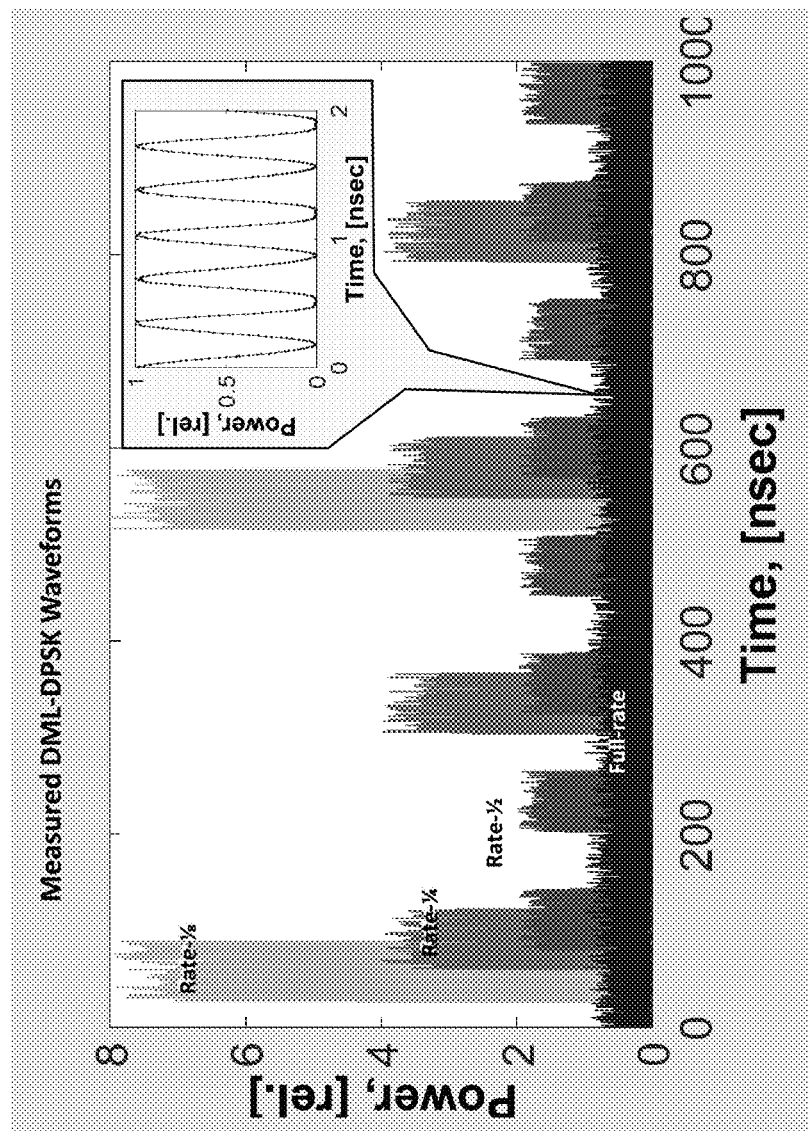
FIG. 11 shows measured optical waveforms emitted by a DML-based transmitter during multi-rate optical communications.

FIG. 11 shows measured optical waveforms emitted by a DML-based transmitter during multi-rate optical communications. The waveforms include optical signals at full rate, ½ rate, ¼ rate, and ⅛ rate. The measured signals show good extinction ratio at each data rate. In addition, the measurement also confirms the change of amplitude with respect to the change of data rate as observed in FIG. 10D.

Figure 12A:
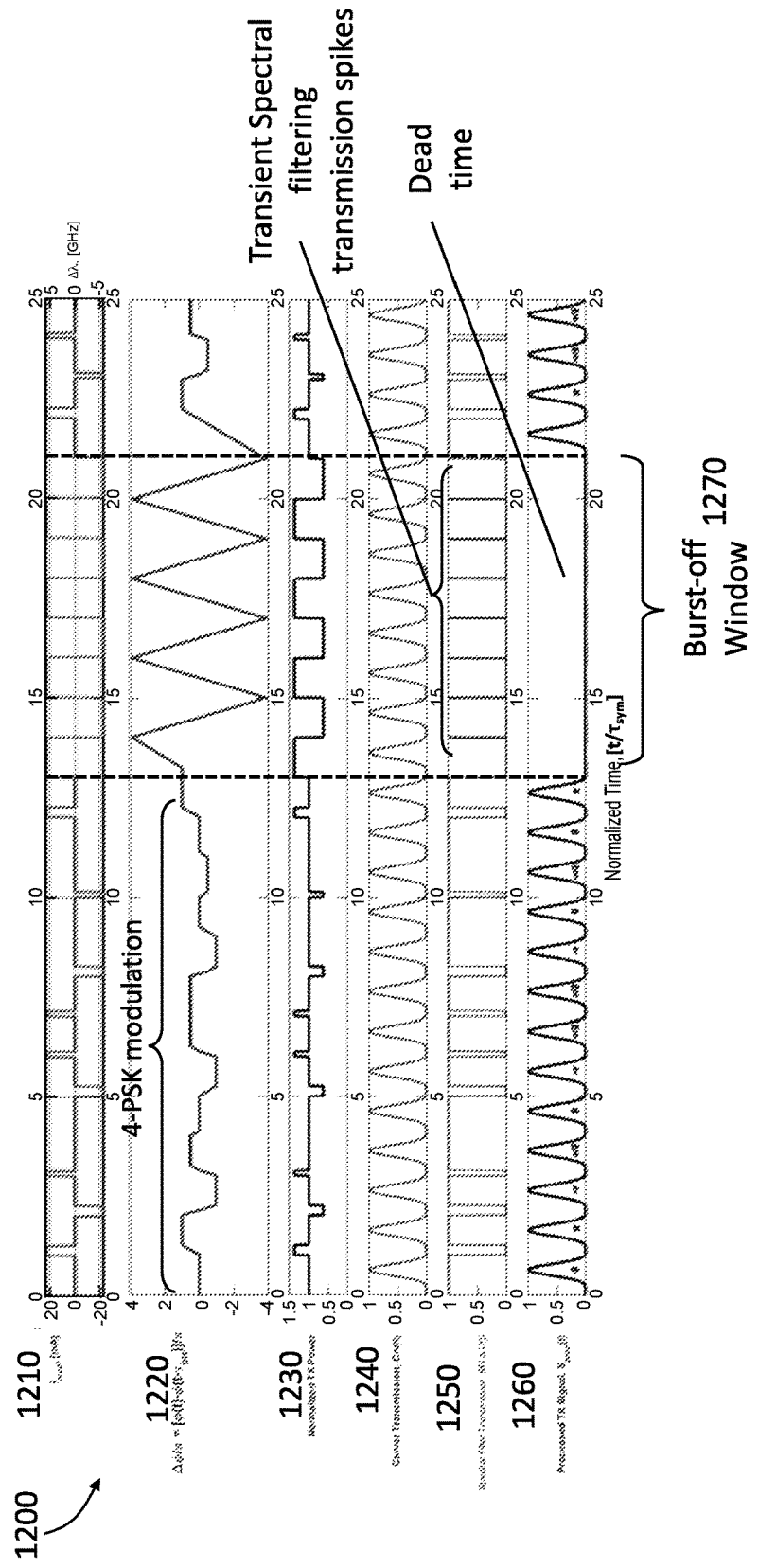
FIG. 12A shows a sequence of waveforms 1200 for generating a burst-mode 4-DPSK symbol for multi-rate optical communications.

FIG. 12A shows a sequence of waveforms 1200 for generating a 4-DPSK symbol for multi-rate optical communications. The waveforms 1200 include a burst-off window 1270, during which no data is transmitted. In FIG. 12A, a single drive level waveform imod(t) 1210 is used to drive the laser. During the burst-off window 1270, the drive signal 1210 includes periodic square waves. The resulting phase changes ΔΦ(t) 1220 include four values {0, π/2, −π/2, and π}. During the burst-off window, the resulting phase change 1220 includes a sawtooth wave.

Normalized TX power 1230 as a function of time illustrates the optical signal prior to spectral-temporal filtering (e.g. the first optical signal 101). The waveform during the burst-off window includes periodic square waves, thereby carrying no encoded data. The temporal filter used in the spectral-temporal filtering has a transmission characterized by a Gaussian-shaped carver waveform Crv(t) 1240. The spectral filter in the spectral-temporal filtering has a transmission profile SF(Δλ(t)) 1250. During the burst-off window, the spectral transmission profile 1250 includes a sequence of transmission spikes, each of which is substantially aligned with a corresponding transmission valley in the temporal transmission profile 1250. The product of the Normalized TX Power Crv(t) 1240, and SF(Δλ(t)) 1250 yields the envelope of the processed optical signal Sproc(t) 1260, which transmits the phase information Δλ(t) during the burst-on time and transmits no data during the burst-off window. FIG. 12A shows the capability of performing burst-mode 4-DPSK (to support burst-mode DPSK or other formats) with simple tri-state pulse width modulated (PWM) DML waveforms and T-F filtering. This essentially provides a simple DML-based means of generating phase and intensity modulated optical signals with good fidelity.

In FIG. 12A, different phase changes are generated by different pulse widths (e.g., π generated with amplitude A and width dT and π/2 generated with amplitude A and width dT/2). The time alignment is selected so that the transition occurs during the carver-off time with the desired phase passed during the carver on-time. Attenuation or blocking of the signal after the spectral-temporal window can be achieved by widening the imod(t) pulses 1210 during the burst-off time using alternating positive and negative going pulses. Good attenuation may involve both spectral and temporal alignment of Δλ(t) 1220 and the spectral-temporal filter so that the peak transmission of the frequency modulated optical signal Δλ(t) 1220 falls far enough outside the pass-band of the spectral filter, and the attenuation yields an |ER|>|DC|+30 dB (so that TX power robbing penalties may be avoided). In addition, the transitions are aligned to fall substantially within the carver off time of the temporal filter so that the transient transition spikes that pass through the spectral filtering are rejected from the processed TX signal, Sproc(t) 1260.

For good DPSK communications, it can be helpful for the carrier wavelength of the transmitted optical signal to be well-aligned to the RX delay-line interferometer in order to avoid significant performance penalties. By using the AC-balanced burst-off modulation approach, the TX carrier wavelength may be maintained with the duty-cycle of the positive and negative burst-off waveforms adjusted as appropriate to correct for wavelength offsets.

The power and energy per bit used for the burst-off windowing signals can be larger than the data modulation signals. However, this power may be kept at relatively low levels by using spectral filter with a narrow pass bandwidth. For example, the spectral filter can include a Gaussian filter with bandwidth less than 3 times the symbol rate. In this case, it takes less energy of the burst-off signal to push the output wavelength of the laser to be outside the pass band.

Figure 12B:
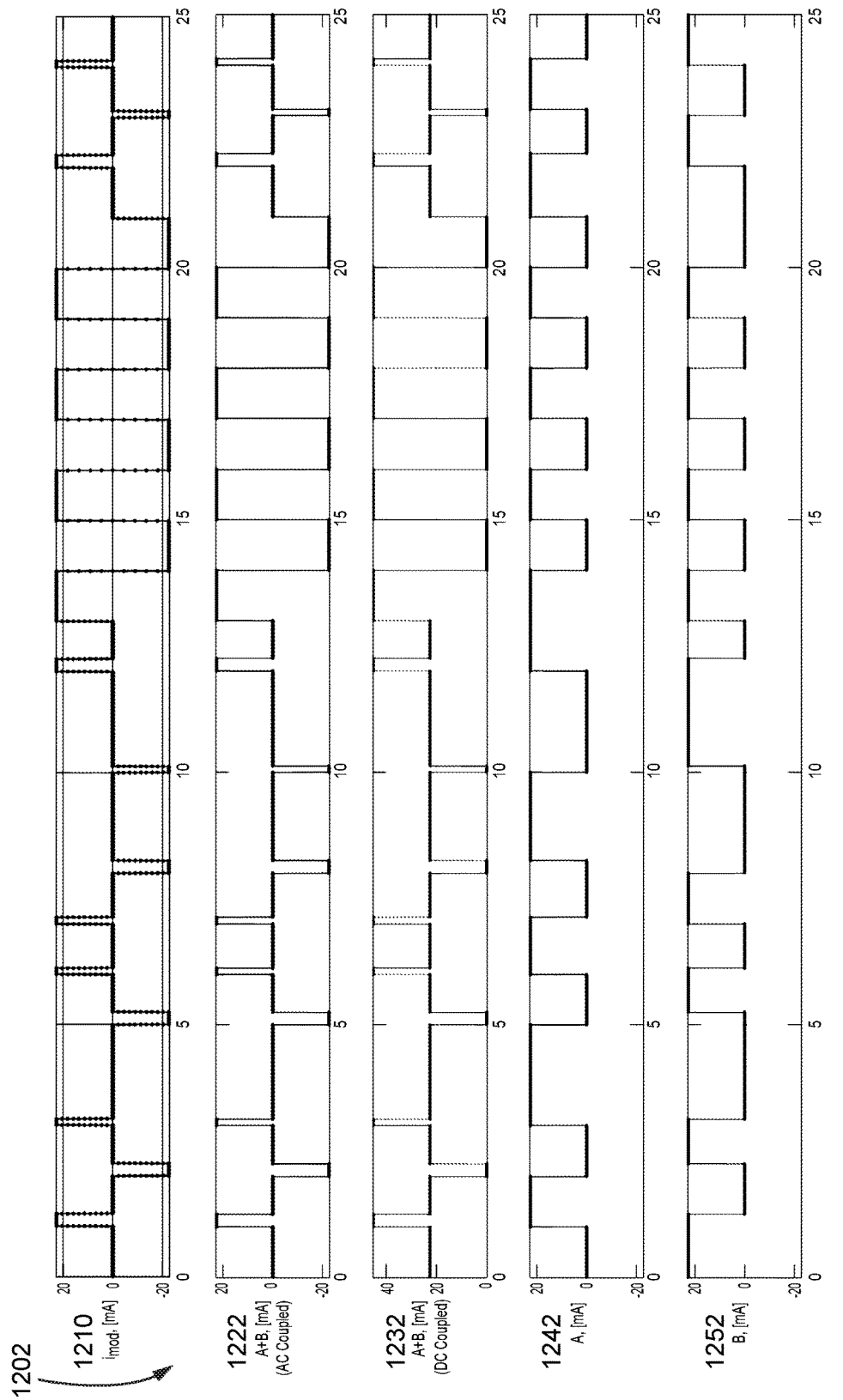
FIG. 12B shows a sequence of waveforms that can be summed to create waveforms for generating a burst-mode 4-DPSK symbol for multi-rate optical communications.

FIG. 12B shows a sequence of waveforms 1202 that can be summed to create waveforms for generating a burst-mode 4-DPSK symbol for multi-rate optical communications. These waveforms include waveforms 1242 and 1252 that can be generated by, for example, drivers 940a and 940b in the apparatus 900 shown in FIG. 9C. The sum waveforms 1222 (AC coupled) and 1232 (DC coupled) are also shown.

Optical Receivers in DML-Based Optical Communication

Figure 13:
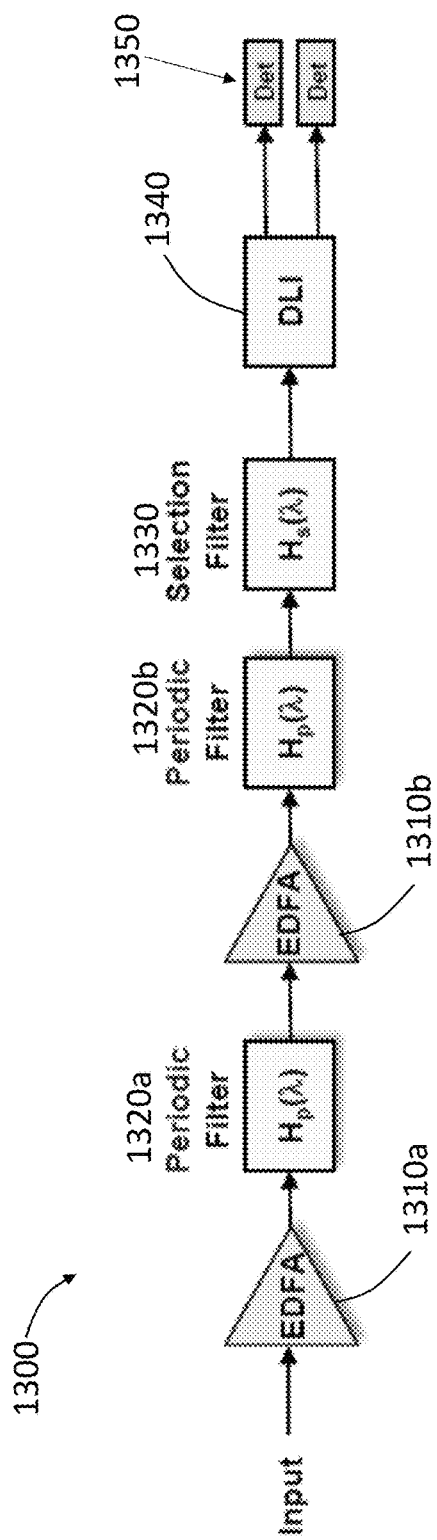
FIG. 13 shows a schematic of a receiver for detecting and demodulating optical signals in DML-based optical communications.

FIG. 13 shows a schematic of an apparatus 1300 for receiving and demodulating optical signals in DML-based optical communications. The apparatus 1300 includes a first amplifier 1310a to receive and amplify an input signal (e.g., the signal emitted by the apparatus 100 in FIG. 1), followed by first periodic frequency filter 1320a. The apparatus 1300 also includes a second amplifier 1310b to amplify the output of the first periodic filter 1320a, followed by a second periodic filter 1320b. A selection filter 1330 is employed to modulate the frequency of the received optical signals. The output of the selection filter 1330 is sent to a delay line interferometer (DLI) 1340 to extract the encoded phase shifts in the received optical signals. Two detectors 1350 are used in the apparatus 1300 to measure the phase shifts and recover the data encoded in the optical signals.

Figure 14:
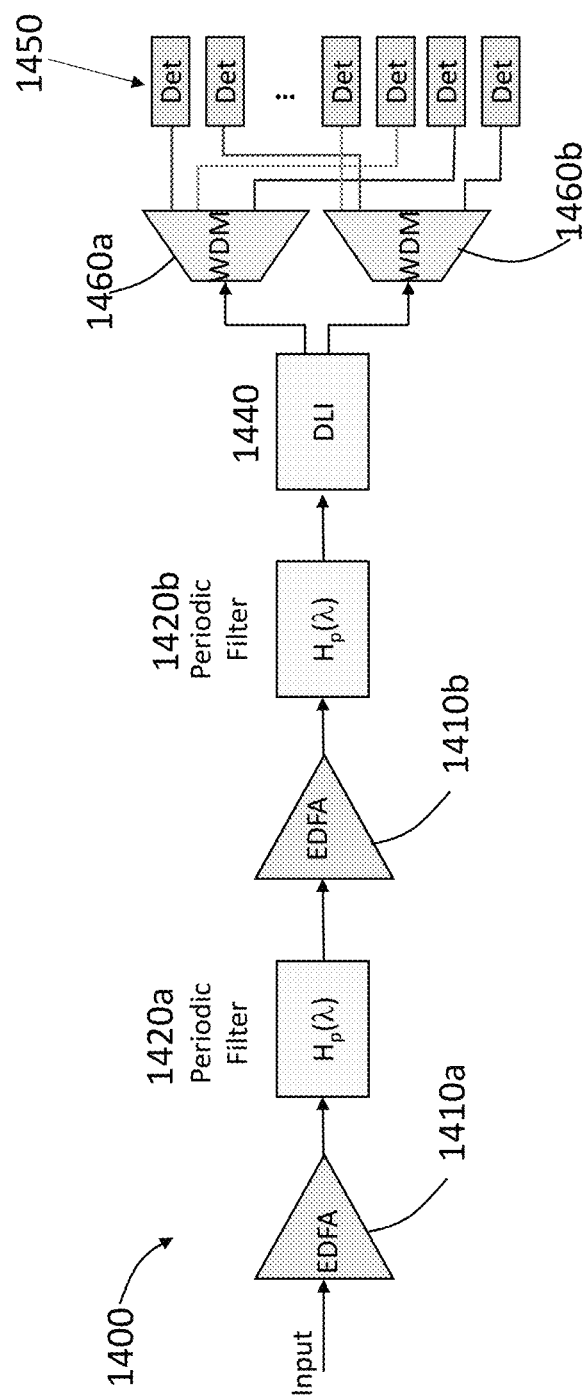
FIG. 14 shows a schematic of an optical receiver using balanced detection.

FIG. 14 shows a schematic of an optical receiver 1400 using balanced detection. The receiver 1400 includes two amplifiers 1410a and 1410b and two periodic filters 1420a and 1420b (similar to the amplifiers 1310 and periodic filters 1420 in the apparatus 1300), followed by a DLI 1440 to extract phase shifts encoded in the optical signals. The outputs of the DLI 1440 are sent to two demultiplexers 1460a and 1460b, which direct each wavelength component to a respective detector in a detector array 1450.

Figure 15:
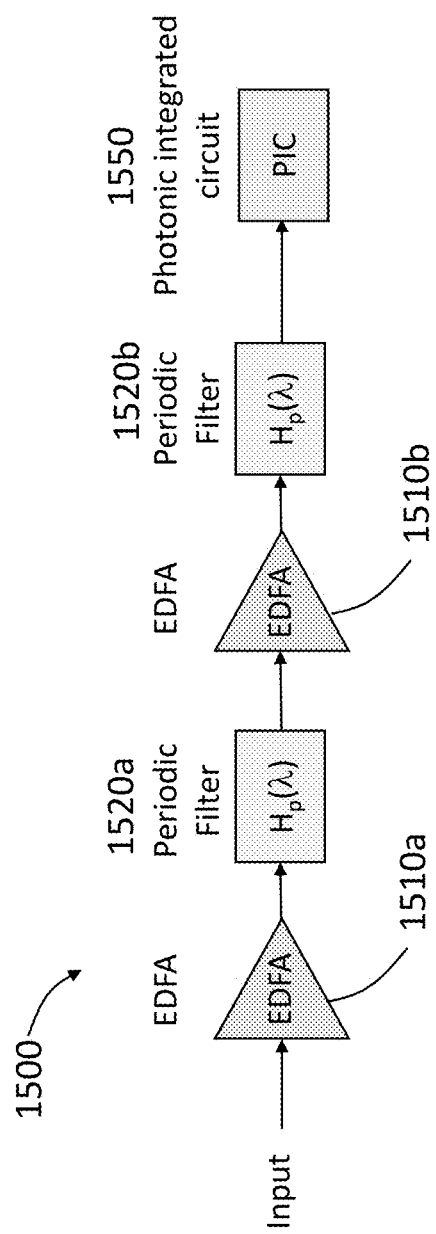
FIG. 15 shows a schematic of an optical receiver including a photonic integrated circuit (PIC) for demodulation.

FIG. 15 shows a schematic of an optical receiver 1500 including a photonic integrated circuit (PIC) 1550 for demodulation. The receiver 1500 includes two amplifiers 1510a and 1510b and two periodic filters 1520a and 1520b (similar to the amplifiers 1310 and periodic filters 1420 in the apparatus 1300). The output of the second periodic filter 1520b is sent to the PIC 1550 for demodulation.

Experimental Characterization of DML-Based Optical Communication

Using transmitters (e.g., apparatus 100 in FIG. 1 and apparatus 800 in FIG. 8) and receivers (e.g., apparatus 1300 in FIG. 13, 1400 in FIG. 14, and 1500 in FIG. 15) in conjunction with the burst-mode waveforms described herein, multi-rate DPSK experiments were performed over the range of data rates from the full rate channel rate of about 2880 MHz to about 72 Mbps (rate $\frac{1}{40}^{th}$).

Figure 16:
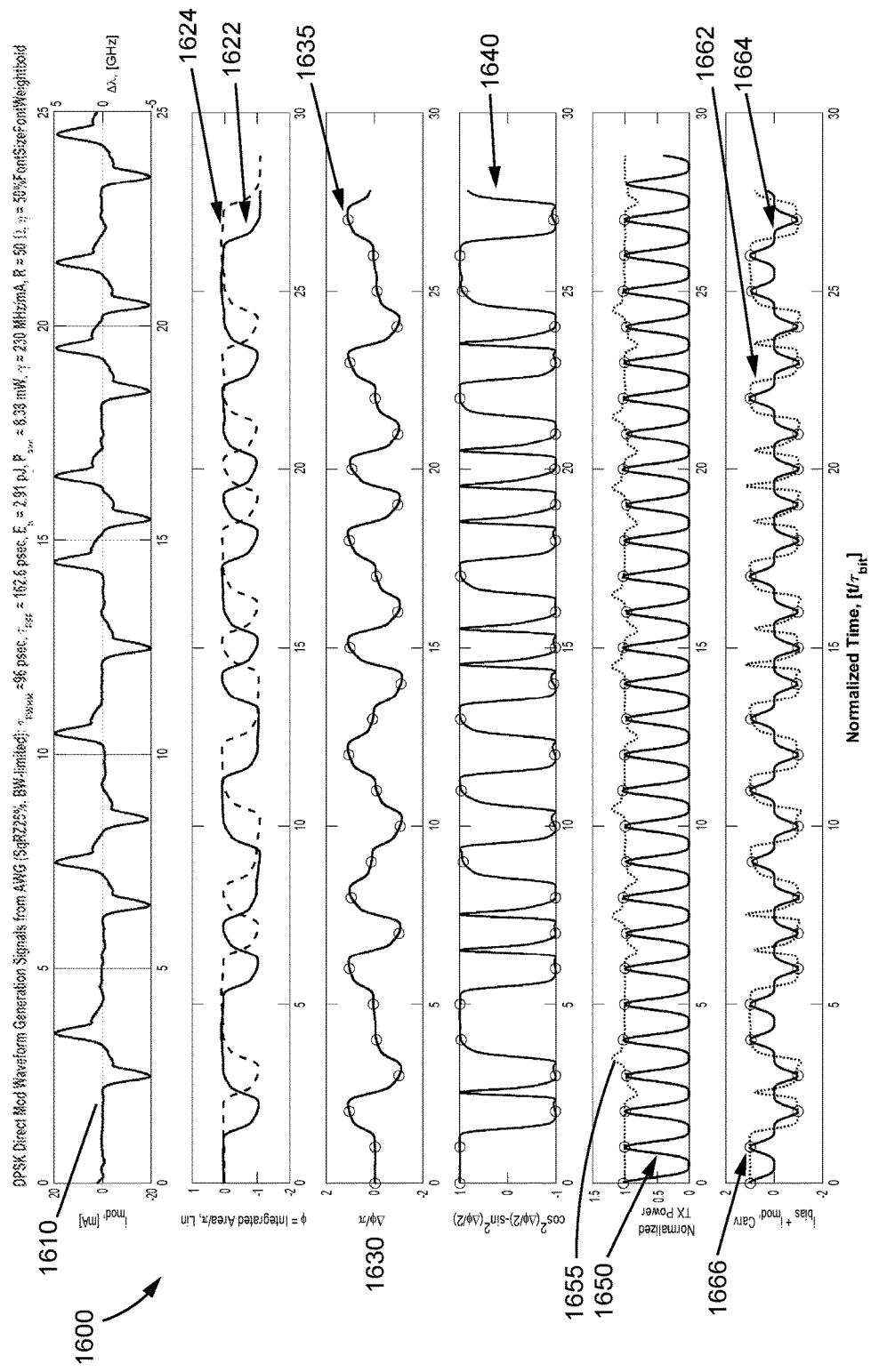
FIG. 16 shows measured 2-DPSK drive waveforms and signal waveforms in DML-based optical communications.

FIG. 16 shows measured 2-DPSK drive waveforms and signal waveforms 1600 in DML-based optical communications. The waveforms 1600 include a measured DML current drive waveform 1610, which is generated based on pre-coded data signals (see, e.g., 530 in FIG. 5). The current drive 1610 causes a laser to emit light with different phase shifts. For example, the waveforms 1600 include a first integrated optical phase $\Phi(t)$ 1622 of a first optical signal and a second integrated optical phase $\Phi(t+\tau_{bit})$ 1624 of a second optical signal (e.g. adjacent to the first optical signal in the temporal domain).

The phase change $\Delta\Phi$ between the first optical signal and the second optical signal is illustrated in a phase change waveform 1630. The phase change waveform 1630 also includes sample points 1635 where the phase is either 0 or $\pi$. DLI transmission of un-carved TX waveforms 1640 is shown below the phase change waveform 1630. The waveform 1650 shows the carver profile and 1655 shows un-carved TX Power (normalized) having power transients due to the modulation. The bottom of the FIG. 16 shows DLI transmission of un-carved TX waveforms 1662 and pulse-carved TX waveforms 1664. The pulse carving noticeably reduces phase and intensity transients. Sample decision points 1666 are also shown in FIG. 16. The e waveforms 1600 in FIG. 16 show good DPSK communication performance when pulse-carving is used to remove transients from the phase and intensity and sample the stable region of the TX optical signal.

Figure 17A:
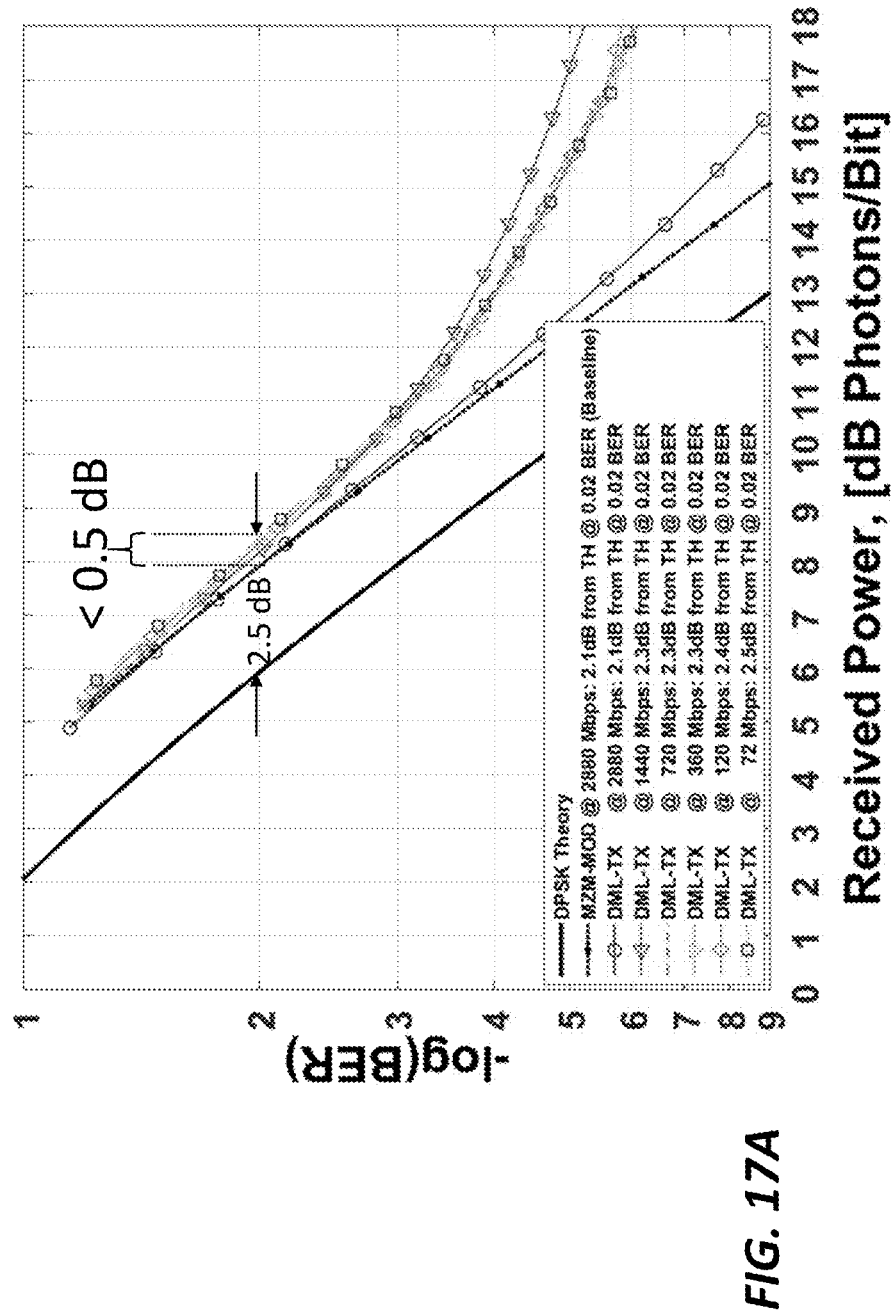
FIGS. 17A and 17B show measured bit error rates (BERs) versus received power in optical communications with rates from about 72 Mbps to about 2.88 Gbps.
Figure 17B:
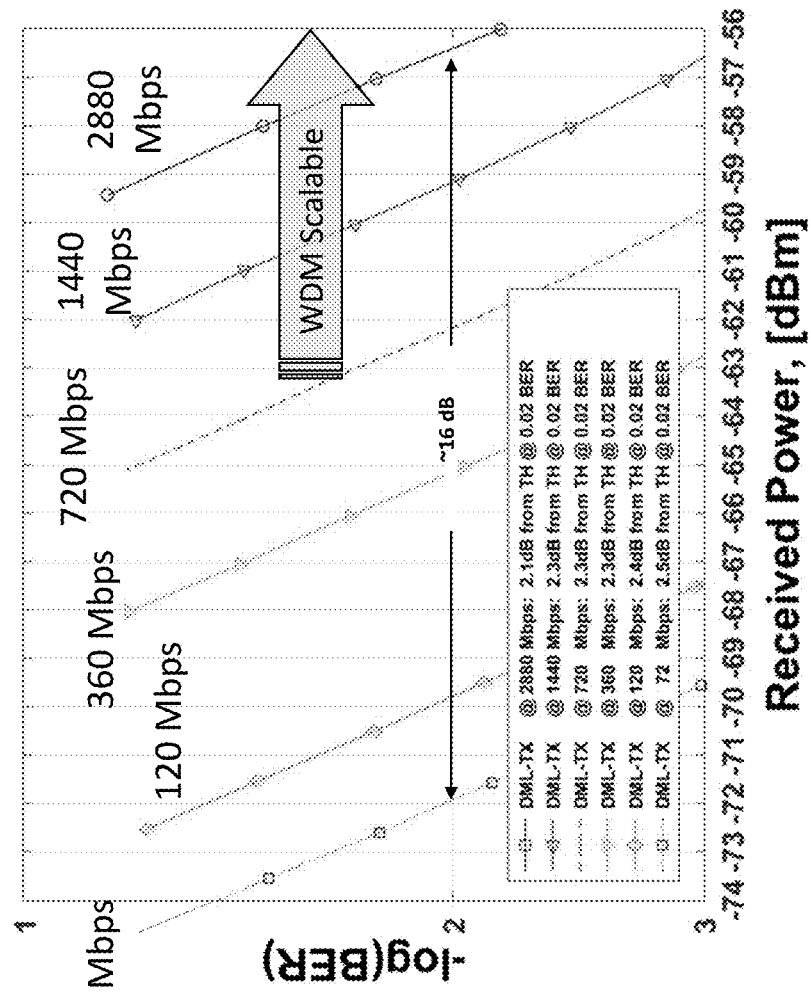

FIG. 17A shows measured bit error rates (BERs) in optical communications with rates from about 72 Mbps to about 2.88 Gbps. FIG. 17B shows the measured BERs in the range above $10^{-3}$. For comparison, the theoretical limit of BER is also included in FIG. 17A. As can be seen from FIG. 17A, near theoretical performance is achieved at all rates, with measured BER within 2.5 dB from theory at about $10^{-2}$ BER, which is below the error-free threshold for strong 100% overhead DVBS-2 forward error correction (FEC).

At full rate, there is no observable difference between baseline measurements with a conventional MZM-based TX and the DML-DPSK TX, at high error rate. Performance at the lower burst-mode rates degrades by less than about 0.5 dB and is within about 0.1 dB of the baseline MZM measurements at high error rates. Thus, the full range of rates enables high-sensitivity operation over a nearly 16 dB span of RX powers. While there are additional penalties observed at lower BERs that are more exaggerated in the lower burst-mode rates, these are well below the FEC cutoff and largely inconsequential for the envisioned applications.

Figure 18A:
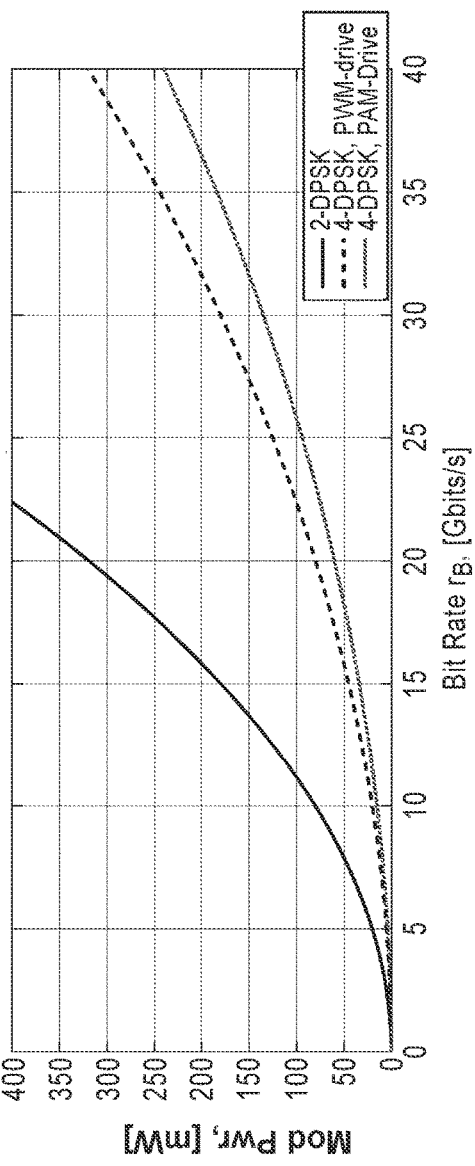
FIGS. 18A and 18B show minimum modulation power estimates for DML-based 2- and 4-DPSK as a function of bit rate.
Figure 18B:
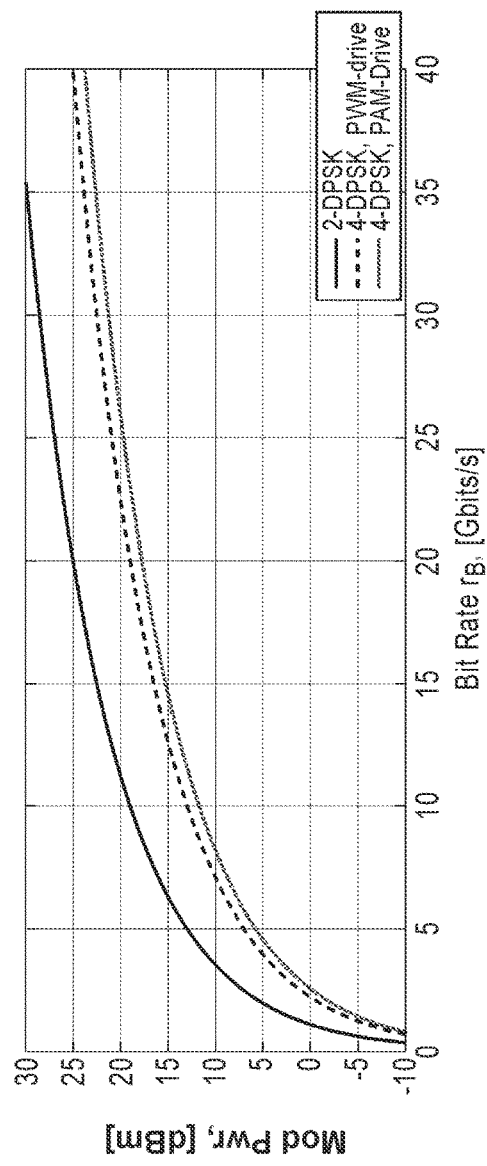

FIGS. 18A and 18B show modulation power estimates for DML-based 2- and 4-DPSK as a function of bit rate.

Figure 19A:
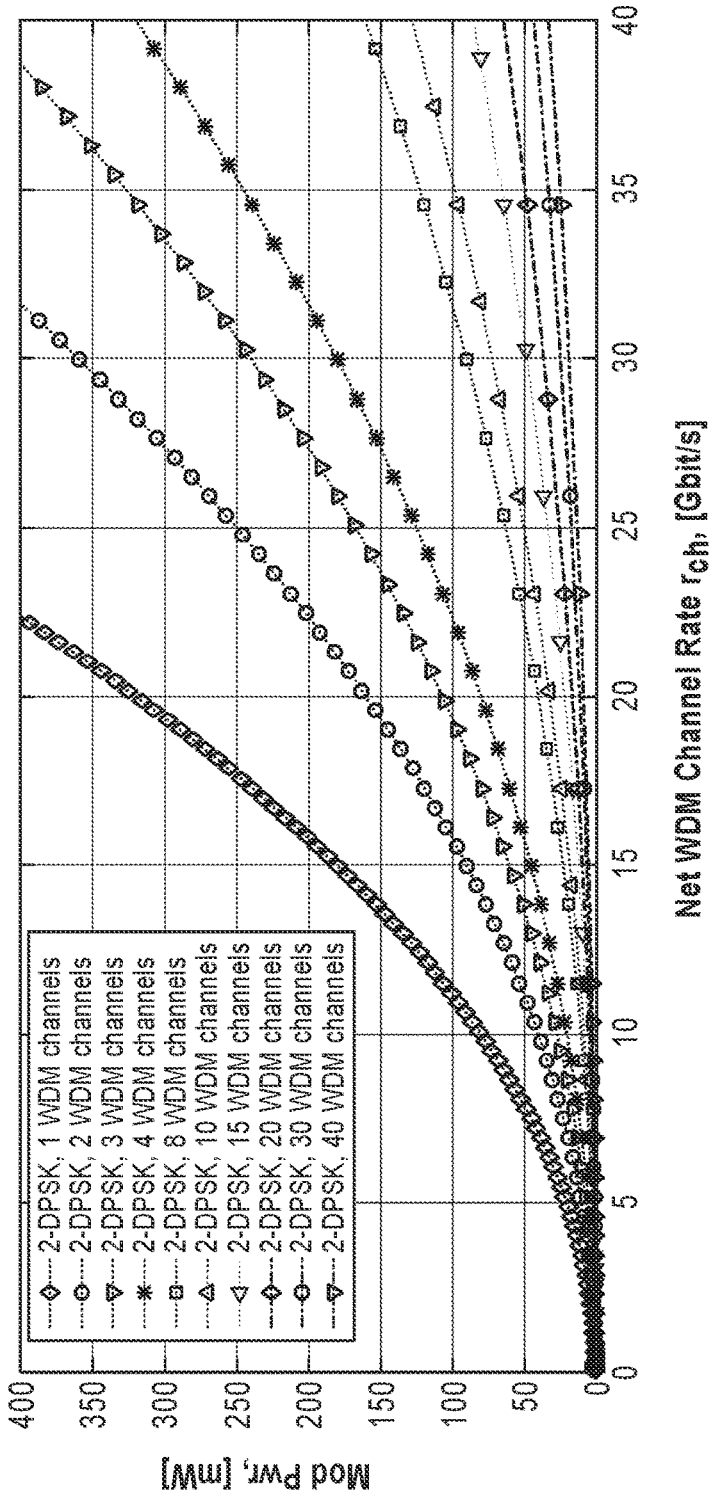
FIGS. 19A and 19B show minimum modulation power estimates for DML-based 2- and 4-DPSK as a function of net WDM bit rate.
Figure 19B:
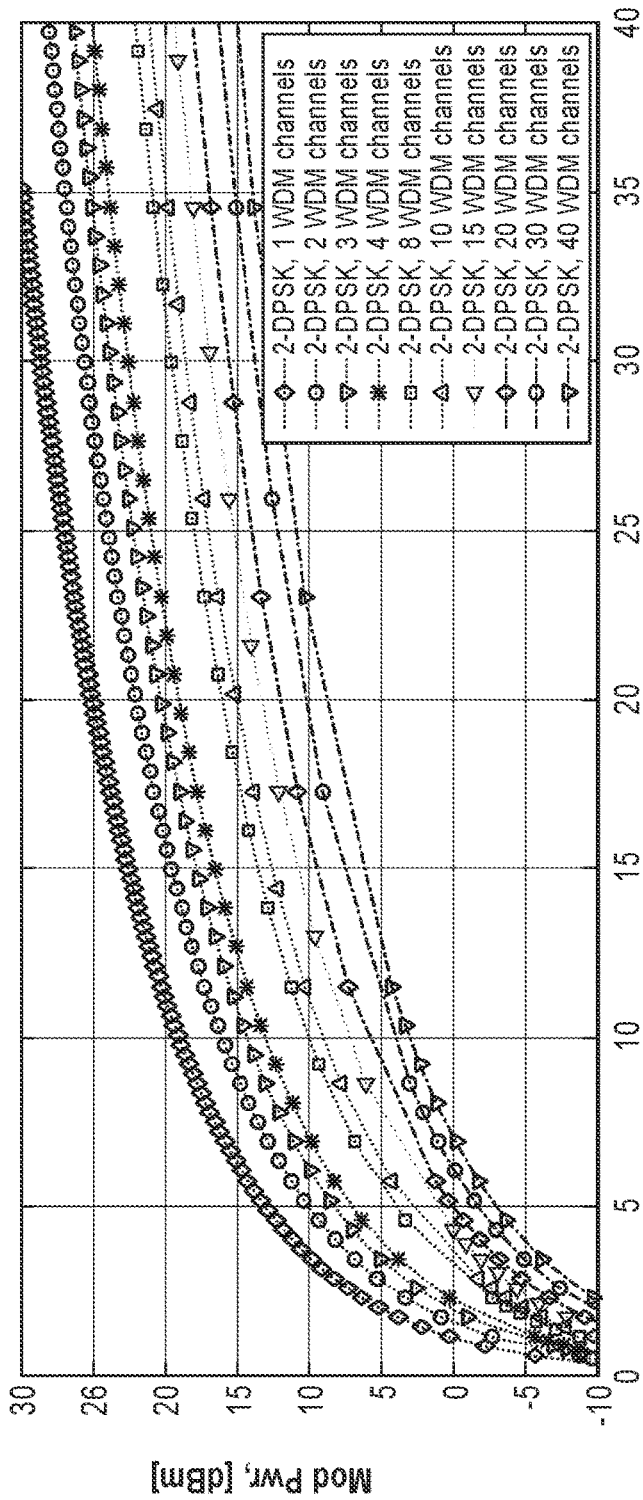

FIGS. 19A and 19B show modulation power estimates for DML-based 2- and 4-DPSK as a function of net WDM bit rate.

Power Consumptions in DML-TF-Based Optical Communication

DML-based DPSK TX can be compatible with near-theoretical RX performance as discussed herein, thereby allowing power efficient operation of optical communication. For a time-varying modulation current $\Delta i(t)$, the time-dependent power P(t) can be written as:

$$P(t) = [\Delta i(t)]^2 \frac{R}{\eta} \tag{3}$$

where $\eta$ is the efficiency of the drive circuitry ($0 < \eta \leq 1$) and R is net impedance. R is often about 50$\Omega$ to avoid RF reflections; however it is sometimes lower for DMLs with integrated or co-packaged drivers where the time corresponding to the distance between the driver and the DML is small relative to the rise-time of the modulation. Thus, given Equation (3), it is desirable to have high efficiency, low modulation current and low impedance in order to lower modulation power consumption. The modulation energy per symbol $E_{sym}$ is integrated power over a bit duration $\tau_{sym}$, i.e.:

$$E_{sym} = \frac{R}{\eta} \int_0^{\tau_{sym}} [\Delta i(t)]^2 dt, \tag{4}$$

For general M-DPSK, with $k=\log_2(M)$ bits/symbol and bit rate $r_b = r_{sym} \log_2(M)$, where $r_{sym} = 1/\tau_{sym}$ represents the symbol rate. The average modulation energy per symbol, is given by $$\overline{E}_{sym} = \frac{1}{M}\sum_{k=1}^{M} E_{sym_k} = \frac{R}{M\eta}\sum_{k=1}^{M} \int_0^{\tau_{sym}} [\Delta i(t)]^2 dt, \tag{4A}$$

where $\Delta i_k$ represent the current change needed to impart the phase change $\Delta\phi_k$ for the $k^{th}$ symbol. The corresponding modulation energy per bit is $$E_b = \frac{\overline{E}_{sym}}{\log_2(M)}, \tag{4B}$$

so even if $E_{sym}$ is relatively constant as M is increased, the modulation energy per bit will improve be a factor of $\log_2(M)$.

For 2-DPSK, the phase change $\Delta\phi_0 = 0$ when logical '0' is sent (requiring no modulation current) or $\Delta\phi_1 = \pi$ when logical '1' is sent. Therefore, from Eq. (4A)—which assumes equal probability of sending '1s' or '0s', the average energy per symbol is $$\overline{E}_{sym} = \frac{1}{2}[E_0 + E_1] = \frac{R}{2\eta}\left[\int_0^{\tau_{sym}}[\Delta i_0(t)]^2 dt + \int_0^{\tau_{sym}}[\Delta i_1(t)]^2 dt\right] = \frac{E_1}{2}, \quad (5)$$

where $\Delta i_1$ and $\Delta i_0$ represent the current change used to generate a logical '1' or '0' respectively. The average modulation power is $$\overline{P} = \overline{E}_{sym} r_{sym} = \frac{\overline{E}_{sym}}{\tau_{sym}} = E_b r_b, \quad (6)$$

where $r_{sym} = 1/\tau_{sym}$ represents the symbol rate.

For systems with W-independent WDM channels (see, e.g., FIG. 7) operating with the same format and symbol rate, the average power is $$\overline{P} = W\overline{E}_{sym} r_{sym} = WE_b r_b, \quad (6A)$$

which assumes that the efficiency per channel is maintained as the number of channels grows. This assumption is reasonable when considering the DML modulation power exclusively, but can be adjusted when considering additional factors such as the sharing of a common carver, which can improve the aggregate per channel efficiency since the carver cost may be amortized across all W channels. The general expression for the aggregate WDM channel rate becomes $$r_{ch} = Wr_{sym} \log_2(M) = Wr_b. \quad (6B)$$

For binary 2-DPSK with 1 bit/symbol, the bit rate $r_b = r_{sym} = 1/\tau_b$, where $\tau_b$ is the both the bit and symbol duration. From Equation (2), it can be seen that both modulation current and power are reduced or minimized for a non-return-to-zero (NRZ) waveform that has a constant amplitude over the symbol time. In this case, to achieve a $\pi$ phase shift, Equation (2) becomes:

$$\Delta\phi = \pi = 2\pi\int_0^{\tau_b}\Delta f(t)dt = 2\pi\int_0^{\tau_b}\gamma\Delta i(t)dt = 2\pi \cdot \gamma\Delta i_\pi\tau_b \quad (7)$$

which occurs when the integrated frequency change over the symbol duration is ½. Here, $\Delta i_\pi$ is the current change used to achieve the $\pi$ phase shift.

Reorganizing Equation (7) can yield:

$$\Delta i_\pi = \Delta i_1 = \frac{1}{2\gamma\tau_b} = \frac{r_b}{2\gamma}, \Delta i_0 = 0, \text{ and } \Delta f_\pi = \frac{1}{2\tau_b} = \frac{r_b}{2} \quad (8)$$

where $\Delta f_\pi$ is the NRZ frequency change to achieve the $\pi$ phase shift. For uniform return-to-zero (RZ) pulsed waveforms (also referred to as square-RZ or SqRZ waveforms) and duty cycle $\delta$ ($0<\delta\leq 1$, $\delta=1$ for NRZ), Equation (8) becomes:

$$\Delta i_\pi = \frac{1}{2\gamma\tau_b\delta} = \frac{(r_b/\delta)}{2\gamma} \text{ and } \Delta f_\pi = \frac{1}{2\tau_{b\delta}} = \frac{(r_b/\delta)}{2} \quad (9)$$

Thus, it can be seen from Equation (9) that the switching voltage and frequency become larger as the rate (r) grows and waveform duration ($\delta$) shrinks. From these equations, a lower bound for the minimum DPSK modulation drive power and energy per bit can be identified as:

$$E_b = \left(\frac{r_b}{\delta}\right)\left(\frac{R}{\eta}\right)\left(\frac{1}{8\gamma^2}\right) \text{ and } \overline{P} = r_b E_b = \left(\frac{r_b^2}{\delta}\right)\left(\frac{R}{\eta}\right)\left(\frac{1}{8\gamma^2}\right). \quad (10)$$

Equation (9) is valid for more general RZ waveforms with time-varying amplitude $\Delta i(t)$ when $\delta$ is replaced by the square-equivalent duty cycle $\delta_{eq}$ is such that $$\delta_{eq} = \frac{\frac{1}{4}}{\int_0^{\tau_b}[\Delta f(t)]^2 dt} = \frac{\frac{1}{4}}{\int_0^{\tau_b}[\gamma\Delta i(t)]^2 dt}. \quad (11)$$

Unlike conventional electro-optic modulation, where the modulation power may primarily be a function the modulator switching voltage $V_\pi$ that is independent of the rate, DML-based phase modulation power is typically a function of the modulation rate squared, with the energy per bit being linearly proportional to the rate (as seen in Equation (10)). However, for lower rates, this turns out to be an acceptably low value. For example, for DPSK at 2880 Mbps with R=50 $\Omega$, $\delta=25\%$, $\gamma=250$ MHz/mA, and $\eta=50\%$, this yields a respectable drive power of about 7 mW, which is about 2 orders of magnitude smaller than the power used for conventional approach (greater than 5 W). Example binary DPSK DML-DPSK waveforms are shown in FIG. 6C and FIG. 6D using square RZ (SqRZ) pulses with $\delta=25\%$ and $\delta=50\%$ (SqRZ25 and SqRZ50, respectively). The longer SqRZ50 pulses can result in a smaller plateau region where the waveform is stable between transitions.

For symmetric finite duration drive waveforms (e.g., square return-to-zero (RZ)), the location for the time-windowing carver and corresponding RX sample point can be at the midpoint of the symbol, half a bit period after the center of the input pulse. This can provide the largest margin between the sample point and the "edges" where the amplitude and phase of the DML output transition.

For asymmetric waveforms (e.g., a high-pass-filtered step function with an sharp rise-time and exponentially decaying fall time), the location of the RX sample time can be determined based a balance between avoiding the different transition regions at the beginning and end of the symbol. The considerations include: 1) delaying the sample time long enough so that the integrated phase change has substantially converged to its terminal 0 or $\pi$ value, and 2) avoiding the transition to the next symbol value. Being too close to the following transition can degrade performance for two reasons. First, the finite sampling bandwidth of the decision circuit can lengthen the sample duration which can exaggerate inter-symbol-interference penalties. Second, if the pulse carving window is too close to the transition and wide enough to pass a substantial part of the next symbol, this may lead to a non-uniform pulse RX pulse shape that degrades RX filter matching of the TX waveforms.

With low modulation power, scaling to higher rates via multiple WDM channels can lead to a linear increase of the net modulation power. For example, a 10-channel WDM DML-DPSK TX at 2880 Mbps can support rates up to 28.8 Gbps with modulation power far less than about 1 W. These numbers represent data modulation power only and do not include the power for the carver or other elements such as laser bias current and temperature control. However, since the pulse carver is an integral part of the modulation process, it can be accounted for in order to have a fair comparison. Unlike broadband digital drivers, narrow band carver drivers are generally more efficient, consuming less than about 0.5 W to support the generation of about 3 GHz-class pulsed RZ waveforms. Moreover, a single carver can be used to process all WDM channels so that the power cost of the carver may be shared among all the WDM channels. For the 10-channel example noted above, this can amount to an additional power consumption of about 50 mW per channel. The resulting cumulative modulation power estimate is still less than 1 W.

Increases in modulation power efficiency and higher data rates may also be achieved by using non-binary formats such as differential quadrature phase shift keying (DQPSK) or 4-DPSK, or coherent (local oscillator-based) M-PSK formats. The minimum DPSK modulation drive power and energy per bit given in Equation (10) assumes 50% '0' and 'π' phase modulation. For 4-DPSK or 4-PSK, the same assumption means the generation of a 4-ary symbol set: $\{0, \pi/2, -\pi/2, \text{ and } \pm\pi\}$, using modulation currents $\{0, +\Delta i_{\pi/2}, -\Delta i_{\pi/2}, \text{ and } \pm\pi\}$ each occurring about 25% of the time and conveying 2 bits of information per symbol. The phase of $+\pi$ is the same as $-\pi$, so $\pm\pi$ represents only one symbol. However, the ability to generate both $+\pi$ and $-\pi$ is generally useful for DML-based phase modulation since it allows for the use of balanced drive waveforms and reduction of accumulated phase offsets. This provides benefits such as reducing the impact of thermal and phase walk-off effects that may lead to carrier wavelength shifts and may degrade performance.

Following the approach above, averaging the minimum modulation power for each symbol and accounting for the multiple bits per symbol the drive power and energy per bit for 4-PSK generation is $$E_b = \frac{E_{sym}}{\log_2(M)} = \left(\frac{r_b}{\delta}\right)\left(\frac{R}{\eta}\right)\left(\frac{1}{128\gamma^2}\right) \text{ and } r_b E_b = \left(\frac{r_b^2}{\delta}\right)\left(\frac{R}{\eta}\right)\left(\frac{1}{128\gamma^2}\right). \quad (12)$$

This corresponds to a factor of about 5 (or about 7.3 dB) improvement over the binary PSK minimum average power (at the same rate) and energy per bit estimates due to three reasons: 1) each symbol carries 2-bits (which provides about 3 dB of advantage); 2) to achieve the same bit rate ($r_b$), the symbol pulsewidth may be increased and the modulation current decreased by factor of two, which reduces the power by about another 3 dB; and 3) the average symbol generation energy is lower for 4-DPSK (providing an additional advantage of about 1.2 dB).

Equation (12) assumes that the modulation current to achieve $\pm\pi/2$ is half of the current for a $\pi$ phase shift. FIG. 6D shows example DML-4-DPSK waveform generation using SqRZ25 pulses with $\delta=25\%$ at a 2.88 Gsym/s symbol rate with R=50 Ω, $\gamma=250$ MHz/mA, and $\eta=50\%$. To reduce the complexity, 4-PSK waveforms may also be generated with only 3 levels (2 different drive levels around the common ground) by adjusting the pulse width rather than the amplitude. We refer to the adjustment of the pulse with as pulse width modulation (PWM). Since the modulation power follows the square of the drive amplitude, this approach is not quite as efficient (assuming all things being equal), but may enable a much simpler implementation since it eliminates the need for more complex and power-hungry multi-level drive circuitry such as digital-to-analog converters (DACs) that are often a limiting component in terms power consumption and speed. Since the power-efficiency of high-speed DACs (e.g., DACs that could support GHz-class modulation) are generally lower than that of binary signal generators that could be used for tri-state waveform generation, all things are not equal, and the benefits of simplicity, improved electronics efficiency, and modulation bandwidth may drive the design. The corresponding drive power and energy per bit for 4-PSK generation with constant drive amplitude is:

$$E_b = \left(\frac{r_b}{\delta}\right)\left(\frac{R}{\eta}\right)\left(\frac{1}{32\gamma^2}\right) \text{ and } \bar{P} = r_b E_b = \left(\frac{r_b^2}{\delta}\right)\left(\frac{R}{\eta}\right)\left(\frac{1}{32\gamma^2}\right), \quad (13)$$

which is about 6 dB or about 4 times more efficient than 2-DPSK (with all the same assumptions above still in place). Plots of the modulation power for the three DML M-DPSK schemes described in Equations (10), (12), and (13) for 2-DPSK, PAM 4-DPSK, and PWM-DPSK, respectively, are shown in FIGS. 18A and 18B. Example DML waveforms generating 4-DPSK using tri-state PWM are shown in FIG. 6A, with similar assumptions of 2.88 GHz symbol rate, R=50 Ω, $\delta=25\%$ and 12.5%, and $\eta=50\%$, yielding a respectable 0.6 mW drive power/channel (1.15 pJ/bit) at 5.76 Gbit/s. Due to the square-dependence on $r_b$, reducing the symbol rate to 1.44 GHz consumes only 25% of the modulation power, or 1.66 mW (minimum), to achieve 2.88 Gbit/s using this approach.

The cost of simpler drive waveforms is about 1.25 dB in the lower-efficiency bound relative to using PAM-5-level drive waveforms, but a noteworthy benefit is that the PWM-tri-state waveforms may be generated by the simple addition of two properly phased digital waveforms. This approach of generating tri-state waveforms via addition of digital waveforms is shown in FIGS. 6E-6G and may be used to generate a variety of waveforms such as SqRZ50 and SqRZ25 (and others). These, in turn, may be used to generate the 2-DPSK DML drive signals shown in FIGS. 6C and 6D, and the PWM-type waveforms suitable for generating the 4-DPSK drive signals are shown in FIG. 6A. More general burst-mode M-DPSK waveforms with both phase and intensity modulation are shown in FIG. 12A. Other duty cycle waveforms may be generated using this approach, for example, $1\% \leq \delta \leq 100\%$, with the 1% case being SqRZ01—limited by the bandwidth of the electronics, and the 100% case being SqRZ100 or equivalently NRZ, with the waveform occupying the entire symbol time.

With such a range of pulse widths that may be generated by the addition of two (fast) digital waveforms, the generation of large alphabet M-DPSK waveforms may be achieved (e.g., with M=2, 3, 4, . . . 32 and beyond) that may be used to extend the power-efficiency benefits well beyond those illustrated above for M=2 and 4, without using multi-levels DACs. Even in the case where multi-level waveform generation is readily available, without impairing bandwidth or power consumption criteria, a hybrid waveform generation approach using both PWM and multi-level drive may be employed to achieve even higher resolution. For example, by using 4 pulse widths in conjunction with 4 levels, up to 16 distinct DML-based DPSK phases may be generated.

As described herein, WDM may be used to scale data rates higher. In terms of power efficiency, the modulation energy per bit ($E_b$) for a given modulation rate remains the same as the number of WDM channels (W) grows. However, to achieve a net data rate of $r_{ch}=Wr_b$, the modulation rate for each lower-rate channel is $r_b=r_{ch}/W$. Incorporating Equations (6A), (6B), and (13) into the single-channel energy and power expressions for 2-DPSk in Equation (10)

ca obtain the expressions for the minimum WDM 2-DPSK energy per bit and power to achieve a net rate $r_{ch}$ using W channels:

$$E_b(r_{ch}, W) = \left(\frac{r_{ch}/W}{\delta}\right)\left(\frac{R}{\eta}\right)\left(\frac{1}{8\gamma^2}\right) \text{ and } \overline{P}(r_{ch}, W) = W\left(\frac{(r_{ch}/W)^2}{\delta}\right)\left(\frac{R}{\eta}\right)\left(\frac{1}{8\gamma^2}\right). \quad (14)$$

Equation (14) shows a general expression for the DML-DPSK modulation power for a net channel rate $r_{ch}$ using W channels in terms of the single-channel power at the same rate:

$$\overline{P}(r_{ch}, W) = \overline{P}(r_{ch}, W) = \overline{P}(r_{ch}, 1)/W. \quad (15)$$

Here, $\overline{P}(r_{ch}, 1)$ is single-channel power estimate (e.g., from Equations (10), (12), and (13)) and the 1/W dependence indicates that the WDM modulation power is W-times lower (i.e., more efficient) than the single channel equivalent operating at the same aggregate channel rate. For example, for a given channel rate, the modulation power may be reduced by about 6 dB by distributing the data over 4 channels. And distributing over 10 channels yields about 10 dB reduction in modulation power. Plots of the modulation power for WDM-DML 2-DPSK that highlight these trends are shown in FIGS. 19A and 19B. By using this WDM approach to lower modulation power, perhaps in conjunction with the more power efficient 4-DPSK approaches described above, the modulation power may be adjusted low enough that the drive waveforms may be generated by readily-available power-efficient drive electronics, including, for example, driving DMLs directly from the low-power high-speed outputs from digital electronics with drive levels less than 1 V.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for generating a processed optical signal, the apparatus comprising:
    a first laser configured to emit a first optical signal in response to a first drive signal, the first optical signal having a first phase shift depending on a first integrated amplitude of the first drive signal, the first phase shift having a value selected from the group consisting of $-\pi$, $-\pi/2$, 0, $\pi/2$, and $\pi$; and
    a spectral-temporal filter in optical communication with the first laser and configured to change a first spectral profile and a first temporal profile of the first optical signal so as to generate the processed optical signal.

2. The apparatus of claim 1, wherein the first laser comprises a current-driven laser, the drive signal comprises an electrical current of about 30 mA or less, and the processed optical signal has a data rate of about 2 gigabits per second or greater.

3. The apparatus of claim 1, wherein the spectral-temporal filter comprises:
    a spectral filter configured to change the first spectral profile of the first optical signal; and
    a temporal filter in optical communication with the spectral filter and configured to change the first temporal profile of the first optical signal.

4. The apparatus of claim 3, wherein the temporal filter is configured to attenuate at least one transition region in a waveform of the first optical signal so as to reduce power and/or phase fluctuation in the first optical signal.

5. The apparatus of claim 3, wherein the processed optical signal has a symbol rate and the spectral filter has a bandwidth substantially equal to or less than three times the symbol rate.

6. The apparatus of claim 3, wherein the temporal filter has a duty cycle substantially equal to or less than 50%.

7. The apparatus of claim 1, wherein the first optical signal is at a first carrier wavelength, and the apparatus further comprises:
    a second laser configured to emit a second optical signal in response to a second drive signal, the second optical signal having a second phase shift based on the second drive signal and a second carrier wavelength different from the first carrier wavelength of the first optical signal; and
    a wavelength-division multiplexer in optical communication with the first laser and the second laser and configured to multiplex the first optical signal and the second optical signal, wherein the spectral filter is configured to change a second spectral profile of the second optical signal and the temporal filter is configured to change a second temporal profile of the second optical signal.

8. The apparatus of claim 1, wherein the spectral-temporal filter has a spectral pass band, and the apparatus further comprises:
    a driver operably coupled to the first laser and configured to generate a burst-off signal between symbols of the first optical signal so as to cause the first laser to emit a third optical signal having a wavelength outside the spectral pass band of the spectral filter such that the spectral filter attenuates the optical beam.

9. The apparatus of claim 8, wherein:
    the driver is configured to generate the burst-off signal having multiple cycles,
    each cycle of the burst-off signal has a positive half cycle and a negative half cycle, and
    a first power in the positive half cycle is less than a second power in the negative half cycle.

10. The apparatus of claim 8, wherein the driver is operably coupled to a temporal filter in the spectral-temporal filter and is configured to attenuate the third optical signal by at least 15 dB with the temporal filter.

11. The apparatus of claim 8, wherein the driver is configured to change a duty cycle of the processed optical signal from about 2.5% to about 100%.

12. The apparatus of claim 8, wherein the burst-off driver is configured to change a data rate of the processed optical signal by between about 1 megabits per second to about 2.5 gigabits per second.

13. The apparatus of claim 8, wherein the driver comprises:
    a signal driver configured to generate the first drive signal; and
    a burst-off driver configured to generate the burst-off signal.

14. A method of generating a processed optical signal, the method comprising:
    causing a first laser to emit a first optical signal having a first phase shift depending on a first integrated amplitude of a first drive signal, the first phase shift having a value selected from the group consisting of $-\pi$, $-\pi/2$, 0, $\pi/2$, and $\pi$; and
    passing the first optical signal through a spectral-temporal filter to change a first spectral profile and a first temporal profile of the first optical signal so as to generate the processed optical signal.

15. The method of claim 14, wherein causing the first laser to emit the first optical signal comprises modulating the first laser with an electrical current of about 30 mA or less and a data rate of about 2 gigabits per second or greater.

16. The method of claim 14, wherein passing the first optical signal through the spectral-temporal filter comprises:
    passing the first optical signal through a spectral filter to change the spectral profile of the first optical signal; and
    passing the first optical signal through a temporal filter to change the temporal profile of the first optical signal.

17. The method of claim 16, wherein passing the first optical signal through the temporal filter comprises attenuating at least one transition region in a waveform of the first optical signal so as to reduce a power and/or phase fluctuation in the first optical signal.

18. The method of claim 14, wherein the first optical signal is at a first carrier wavelength, and the method further comprises:
    causing a second laser to emit a second optical signal having a second phase shift depending on a second amplitude of a second drive signal, the second optical signal being at a second carrier wavelength different from the first carrier wavelength of the first optical signal;

multiplexing the second optical signal with the first optical signal to generate the processed optical signal.

19. The method of claim 14, further comprising:
converting a data signal into a pre-coded differential phase shift keying (DPSK) signal; and
converting the pre-coded DPSK signal into the first drive signal.

20. The method of claim 14, wherein the spectral filter has a spectral pass band, and the method further comprises:
sending a burst-off signal to the first laser so as to cause the first laser to generate a third optical signal at a wavelength outside the spectral pass band of the spectral filter.

21. The method of claim 20, wherein the burst-off signal has multiple cycles, each cycle of the burst-off signal having a positive half cycle and a negative half cycle, and a first power in the positive half cycle is less than a second power in the negative half cycle.

22. The method of claim 20, further comprising:
attenuating the third optical signal with a temporal filter in the spectral-temporal filter.

23. The method of claim 20, further comprising:
changing a duty cycle of the processed optical signal from about 2.5% to about 100% using the burst-off signal.

24. The method of claim 20, further comprising:
changing a data rate of the processed optical signal by between about 1 megabits per second to about 2.5 gigabits per second using the burst-off signal.

25. A transmitter for generating a differential phase shift keyed (DPSK) optical signal, the apparatus comprising:
a DPSK encoder to convert a data signal into a pre-coded DPSK signal;
a first driver, operably coupled to the DPSK encoder, to convert the pre-coded DPSK signal into a first drive signal;
a laser, operably coupled to the first driver, to emit a first optical signal in response to the first drive signal, the first optical signal having a phase shift depending on an amplitude of the first drive signal;
a spectral filter, in optical communication with the laser and characterized by a spectral pass band, to spectrally filter the first optical signal;
a temporal filter, in optical communication with the laser, to temporally filter the first optical signal so as to yield the DPSK optical signal; and
a second driver, operably coupled to the laser, to generate a second drive signal, the second drive signal causing the laser to generate an optical beam having a wavelength outside the spectral pass band of the first filter,
wherein the second driver is configured to change a duty cycle of the DPSK optical signal between about 2.5% and about 100%.

26. The transmitter of claim 25, wherein the phase shift of the first optical signal further depends on a pulse width of the first drive signal.

* * * * *